United States Patent
Badawiyeh et al.

(10) Patent No.: US 11,973,992 B2
(45) Date of Patent: Apr. 30, 2024

(54) APPARATUS AND METHODS FOR SELECTIVE SECONDARY CONTENT INSERTION IN A DIGITAL NETWORK

(71) Applicant: Charter Communications Operating, LLC, St. Louis, MO (US)

(72) Inventors: Basil Badawiyeh, Parker, CO (US); Brian Clements, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 471 days.

(21) Appl. No.: 17/164,727

(22) Filed: Feb. 1, 2021

(65) Prior Publication Data

US 2021/0160555 A1    May 27, 2021

Related U.S. Application Data

(62) Division of application No. 15/347,665, filed on Nov. 9, 2016, now Pat. No. 10,911,794.

(51) Int. Cl.
*H04N 21/234* (2011.01)
*H04L 65/70* (2022.01)
(Continued)

(52) U.S. Cl.
CPC ....... *H04N 21/23424* (2013.01); *H04L 65/70* (2022.05); *H04L 65/765* (2022.05);
(Continued)

(58) Field of Classification Search
CPC ... H04L 65/605; H04L 65/607; H04N 21/222; H04N 21/23424; H04N 21/23614;
(Continued)

(56) References Cited

U.S. PATENT DOCUMENTS 4,521,881 A    6/1985    Stapleford et al.
4,546,382 A    10/1985   McKenna et al.
(Continued)

FOREIGN PATENT DOCUMENTS

CA    2643806 C        6/2013
WO    WO-0110125 A1   2/2001
(Continued)

OTHER PUBLICATIONS

Cisco Intelligent Network Architecture for Digital Video—SCTE Cable-Tec Expo 2004 information page, Orange County Convention Center, Jun. 2004, 24 pages.
(Continued)

*Primary Examiner* — Olugbenga O Idowu
(74) *Attorney, Agent, or Firm* — Patent Beach PC

(57) ABSTRACT

Apparatus and methods for generating secondary content scheduling and dynamic insertion for users of a managed content distribution network, such as a cable, satellite, of HFCu network. In one embodiment, the secondary content comprises advertising content which is directly related or tied to demographics, psychographics, and/or other metrics of applicability to one or more users of the content distribution network. Individual insertion opportunities are identified (either in advance or dynamically), and relevant or targeted secondary content is dynamically "switched in" for delivery to the one or more users via interaction between a local or client application (e.g., operative on the user's set top box or personal electronic device) and a switched digital video entity of the network, and subsequently switched out if no longer required, thereby conserving network bandwidth and/or other resources.

20 Claims, 23 Drawing Sheets

(51) Int. Cl.
*H04L 65/75* (2022.01)
*H04N 21/222* (2011.01)
*H04N 21/236* (2011.01)
*H04N 21/2385* (2011.01)
*H04N 21/258* (2011.01)
*H04N 21/438* (2011.01)
*H04N 21/6543* (2011.01)
*H04N 21/81* (2011.01)

(52) U.S. Cl.
CPC ..... *H04N 21/222* (2013.01); *H04N 21/23614* (2013.01); *H04N 21/2385* (2013.01); *H04N 21/25866* (2013.01); *H04N 21/25883* (2013.01); *H04N 21/4383* (2013.01); *H04N 21/6543* (2013.01); *H04N 21/812* (2013.01)

(58) Field of Classification Search
CPC ......... H04N 21/2385; H04N 21/25866; H04N 21/25883; H04N 21/4383; H04N 21/6543; H04N 21/812
See application file for complete search history.

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,313,454 A | 5/1994 | Bustini et al. |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,673,253 A | 9/1997 | Shaffer |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,409 A | 8/1998 | Tetsumura |
| 5,793,410 A | 8/1998 | Rao |
| 5,812,642 A | 9/1998 | Leroy |
| 5,815,662 A | 9/1998 | Ong |
| 5,862,312 A | 1/1999 | Mann et al. |
| 5,878,324 A | 3/1999 | Borth et al. |
| 5,884,037 A | 3/1999 | Aras et al. |
| 5,914,945 A | 6/1999 | Abu-Amara et al. |
| 5,926,205 A | 7/1999 | Krause et al. |
| 5,929,849 A | 7/1999 | Kikinis |
| 5,935,206 A | 8/1999 | Dixon et al. |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,202,210 B1 | 3/2001 | Ludtke |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,272,176 B1 | 8/2001 | Srinivasan |
| 6,282,713 B1 | 8/2001 | Kitsukawa et al. |
| 6,330,609 B1 | 12/2001 | Garofalakis et al. |
| 6,337,715 B1 | 1/2002 | Inagaki et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,467,089 B1 | 10/2002 | Aust et al. |
| 6,498,783 B1 | 12/2002 | Lin |
| 6,502,076 B1 | 12/2002 | Smith |
| 6,502,139 B1 | 12/2002 | Birk et al. |
| 6,516,412 B2 | 2/2003 | Wasilewski et al. |
| 6,560,578 B2 | 5/2003 | Eldering |
| 6,571,102 B1 | 5/2003 | Hogberg et al. |
| 6,590,865 B1 | 7/2003 | Ibaraki et al. |
| 6,594,699 B1 | 7/2003 | Sahai et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,651,103 B1 | 11/2003 | Markowitz et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,842,783 B1 | 1/2005 | Boivie et al. |
| 6,868,439 B2 | 3/2005 | Basu et al. |
| 6,891,841 B2 | 5/2005 | Leatherbury et al. |
| 6,901,606 B2 | 5/2005 | Wright et al. |
| 6,909,837 B1 | 6/2005 | Unger |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,981,045 B1 | 12/2005 | Brooks |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,012,891 B1 | 3/2006 | Chandran et al. |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,928 B2 | 5/2006 | Kamada et al. |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |

(56) References Cited

U.S. PATENT DOCUMENTS

| | | |
|---|---|---|
| 7,107,462 B2 | 9/2006 | Fransdonk |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,150,017 B1 | 12/2006 | Vogl et al. |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,174,385 B2 | 2/2007 | Li |
| 7,178,161 B1 | 2/2007 | Fristoe et al. |
| 7,181,010 B2 | 2/2007 | Russ et al. |
| 7,191,461 B1 | 3/2007 | Arsenault et al. |
| 7,194,756 B2 | 3/2007 | Addington et al. |
| 7,197,472 B2 | 3/2007 | Conkwright et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,222,078 B2 | 5/2007 | Abelow |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maciesowicz |
| 7,263,065 B1 | 8/2007 | Cahn |
| 7,266,198 B2 | 9/2007 | Medvinsky |
| 7,266,611 B2 | 9/2007 | Jabri et al. |
| 7,266,726 B1 | 9/2007 | Ladd et al. |
| 7,274,661 B2 | 9/2007 | Harrell et al. |
| 7,280,737 B2 | 10/2007 | Smith |
| 7,283,803 B2 | 10/2007 | Karaoguz et al. |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,324,523 B2 | 1/2008 | Dacosta |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,352,775 B2 | 4/2008 | Powell |
| 7,355,980 B2 | 4/2008 | Bauer et al. |
| 7,356,751 B1 | 4/2008 | Levitan |
| 7,363,371 B2 | 4/2008 | Kirby et al. |
| 7,363,643 B2 | 4/2008 | Drake et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van Rijnsoever et al. |
| 7,434,245 B1 | 10/2008 | Shiga et al. |
| 7,457,520 B2 | 11/2008 | Rosetti et al. |
| 7,464,179 B2 | 12/2008 | Hodges et al. |
| 7,567,565 B2 | 7/2009 | La |
| 7,574,726 B2 | 8/2009 | Zhang et al. |
| 7,577,118 B2 | 8/2009 | Haumonte et al. |
| 7,602,820 B2 | 10/2009 | Helms et al. |
| 7,603,529 B1 | 10/2009 | Machardy et al. |
| 7,617,516 B2 | 11/2009 | Huslak et al. |
| 7,690,020 B2 | 3/2010 | Lebar |
| 7,720,432 B1 | 5/2010 | Colby et al. |
| 7,729,940 B2 | 6/2010 | Harvey et al. |
| 7,730,509 B2 | 6/2010 | Boulet et al. |
| 7,757,251 B2 | 7/2010 | Gonder et al. |
| 7,783,316 B1 | 8/2010 | Mitchell |
| 7,801,803 B2 | 9/2010 | Forlai |
| 7,836,178 B1 | 11/2010 | Bedell et al. |
| 7,930,715 B2 | 4/2011 | Hendricks et al. |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson et al. |
| 8,099,757 B2 | 1/2012 | Riedl et al. |
| 8,156,520 B2 | 4/2012 | Casagrande et al. |
| 8,170,065 B2 | 5/2012 | Hasek et al. |
| 8,205,226 B2 | 6/2012 | Ko et al. |
| 8,214,256 B2 | 7/2012 | Riedl et al. |
| 8,296,185 B2 | 10/2012 | Isaac |
| 8,347,341 B2 | 1/2013 | Markley et al. |
| 8,365,212 B1 | 1/2013 | Orlowski |
| 8,365,213 B1 | 1/2013 | Orlowski |
| 8,458,125 B1 | 6/2013 | Chong, Jr. et al. |
| 8,468,099 B2 | 6/2013 | Headings et al. |
| 8,516,529 B2 | 8/2013 | Lajoie et al. |
| 8,571,931 B2 | 10/2013 | Riedl et al. |
| 8,621,501 B2 | 12/2013 | Matheny et al. |
| 8,701,138 B2 | 4/2014 | Stern et al. |
| 8,713,623 B2 | 4/2014 | Brooks |
| 8,726,303 B2 | 5/2014 | Ellis, III |
| 8,769,559 B2 | 7/2014 | Moon et al. |
| 8,997,136 B2 | 3/2015 | Brooks et al. |
| 9,027,062 B2 | 5/2015 | Patel et al. |
| 9,215,423 B2 | 12/2015 | Kimble et al. |
| 9,270,944 B2 | 2/2016 | Brooks |
| 2001/0013123 A1 | 8/2001 | Freeman et al. |
| 2001/0030785 A1 | 10/2001 | Pangrac et al. |
| 2001/0050901 A1 | 12/2001 | Love et al. |
| 2002/0004912 A1 | 1/2002 | Fung |
| 2002/0019984 A1 | 2/2002 | Rakib |
| 2002/0032754 A1 | 3/2002 | Logston et al. |
| 2002/0046404 A1 | 4/2002 | Mizutani |
| 2002/0049902 A1 | 4/2002 | Rhodes |
| 2002/0049980 A1 | 4/2002 | Hoang |
| 2002/0053082 A1 | 5/2002 | Weaver, III et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100059 A1 | 7/2002 | Buehl et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129378 A1 | 9/2002 | Cloonan et al. |
| 2002/0144262 A1 | 10/2002 | Plotnick et al. |
| 2002/0144263 A1 | 10/2002 | Eldering et al. |
| 2002/0146023 A1 | 10/2002 | Myers |
| 2002/0147771 A1 | 10/2002 | Traversat et al. |
| 2002/0152299 A1 | 10/2002 | Traversat et al. |
| 2002/0154655 A1 | 10/2002 | Gummalla et al. |
| 2002/0162109 A1 | 10/2002 | Shteyn |
| 2002/0162115 A1 | 10/2002 | Bruckner et al. |
| 2002/0163928 A1 | 11/2002 | Rudnick et al. |
| 2002/0166119 A1 | 11/2002 | Cristofalo |
| 2002/0170057 A1 | 11/2002 | Barrett et al. |
| 2002/0178445 A1 | 11/2002 | Eldering et al. |
| 2002/0178447 A1 | 11/2002 | Plotnick et al. |
| 2002/0188567 A1 | 12/2002 | Candelore |
| 2002/0194595 A1 | 12/2002 | Miller et al. |
| 2002/0194607 A1 | 12/2002 | Connelly |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005056 A1 | 1/2003 | Yamamoto et al. |
| 2003/0005453 A1 | 1/2003 | Rodriguez et al. |
| 2003/0005454 A1 | 1/2003 | Rodriguez et al. |
| 2003/0007516 A1 | 1/2003 | Abramov et al. |
| 2003/0021412 A1 | 1/2003 | Candelore et al. |
| 2003/0025832 A1 | 2/2003 | Swart et al. |
| 2003/0028884 A1 | 2/2003 | Swart et al. |
| 2003/0033199 A1 | 2/2003 | Coleman |
| 2003/0037068 A1 | 2/2003 | Thomas et al. |
| 2003/0046704 A1 | 3/2003 | Laksono et al. |
| 2003/0056217 A1 | 3/2003 | Brooks |

(56) References Cited

U.S. PATENT DOCUMENTS

| | | |
|---|---|---|
| 2003/0061619 A1 | 3/2003 | Giammaressi |
| 2003/0074565 A1 | 4/2003 | Wasilewski et al. |
| 2003/0077067 A1 | 4/2003 | Wu et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0115612 A1 | 6/2003 | Mao et al. |
| 2003/0118014 A1 | 6/2003 | Iyer et al. |
| 2003/0135860 A1 | 7/2003 | Dureau |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0172376 A1 | 9/2003 | Coffin |
| 2003/0179773 A1 | 9/2003 | Mocek et al. |
| 2003/0182261 A1 | 9/2003 | Patterson |
| 2003/0191826 A1 | 10/2003 | Bellinger et al. |
| 2003/0195927 A1 | 10/2003 | Virine et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2004/0006625 A1 | 1/2004 | Saha et al. |
| 2004/0013136 A1 | 1/2004 | Mailhot et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0103437 A1 | 5/2004 | Allegrezza et al. |
| 2004/0109672 A1 | 6/2004 | Kim et al. |
| 2004/0123313 A1 | 6/2004 | Koo et al. |
| 2004/0133467 A1 | 7/2004 | Siler |
| 2004/0133907 A1 | 7/2004 | Rodriguez et al. |
| 2004/0133917 A1 | 7/2004 | Schilling |
| 2004/0138909 A1 | 7/2004 | Mayer |
| 2004/0146006 A1 | 7/2004 | Jackson |
| 2004/0148625 A1 | 7/2004 | Eldering et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0181811 A1 | 9/2004 | Rakib |
| 2004/0186774 A1 | 9/2004 | Lee |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0199789 A1 | 10/2004 | Shaw et al. |
| 2004/0210936 A1 | 10/2004 | Rao et al. |
| 2004/0236859 A1 | 11/2004 | Leistad et al. |
| 2004/0261114 A1 | 12/2004 | Addington et al. |
| 2004/0261116 A1 | 12/2004 | McKeown et al. |
| 2004/0267965 A1 | 12/2004 | Vasudevan et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050070 A1 | 3/2005 | Sheldon |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0086691 A1 | 4/2005 | Dudkiewicz et al. |
| 2005/0097598 A1 | 5/2005 | Pedlow, Jr. et al. |
| 2005/0108529 A1 | 5/2005 | Juneau |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0160470 A1 | 7/2005 | Strauss |
| 2005/0168323 A1 | 8/2005 | Lenoir et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0276284 A1 | 12/2005 | Krause et al. |
| 2005/0289588 A1 | 12/2005 | Kinnear |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0025148 A1 | 2/2006 | Karaoguz et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0080703 A1 | 4/2006 | Compton |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0171390 A1 | 8/2006 | La Joie |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218601 A1 | 9/2006 | Michel |
| 2006/0218604 A1 | 9/2006 | Riedl et al. |
| 2006/0236353 A1 | 10/2006 | Cheng et al. |
| 2006/0242079 A1 | 10/2006 | Evans et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0288374 A1 | 12/2006 | Ferris et al. |
| 2006/0291506 A1 | 12/2006 | Cain |
| 2006/0294259 A1 | 12/2006 | Matefi et al. |
| 2007/0022459 A1* | 1/2007 | Gaebel, Jr. ........ H04N 21/25883 348/E7.063 |
| 2007/0028260 A1 | 2/2007 | Williams et al. |
| 2007/0029379 A1 | 2/2007 | Peyer |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0055985 A1 | 3/2007 | Schiller et al. |
| 2007/0061818 A1 | 3/2007 | Williams et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De Heer |
| 2007/0101157 A1 | 5/2007 | Faria |
| 2007/0101370 A1 | 5/2007 | Calderwood |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124781 A1 | 5/2007 | Casey et al. |

(56) References Cited

U.S. PATENT DOCUMENTS

| | | |
|---|---|---|
| 2007/0130581 A1 | 6/2007 | Del et al. |
| 2007/0150919 A1 | 6/2007 | Morishita et al. |
| 2007/0153820 A1 | 7/2007 | Gould |
| 2007/0156539 A1 | 7/2007 | Yates |
| 2007/0157234 A1 | 7/2007 | Walker |
| 2007/0157242 A1 | 7/2007 | Cordray et al. |
| 2007/0162927 A1 | 7/2007 | Ramaswamy et al. |
| 2007/0186259 A1 | 8/2007 | Pedlow et al. |
| 2007/0192794 A1 | 8/2007 | Curtis et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0217436 A1 | 9/2007 | Markley et al. |
| 2007/0233857 A1 | 10/2007 | Cheng et al. |
| 2007/0241176 A1 | 10/2007 | Epstein et al. |
| 2007/0244760 A1 | 10/2007 | Bodnar et al. |
| 2007/0250872 A1 | 10/2007 | Dua |
| 2007/0250880 A1 | 10/2007 | Hainline |
| 2007/0263653 A1 | 11/2007 | Hassan et al. |
| 2007/0271386 A1 | 11/2007 | Kurihara et al. |
| 2007/0274400 A1 | 11/2007 | Murai et al. |
| 2007/0276925 A1 | 11/2007 | La Joie et al. |
| 2007/0276926 A1 | 11/2007 | Lajoie et al. |
| 2007/0280232 A1 | 12/2007 | Dec |
| 2008/0016526 A1 | 1/2008 | Asmussen |
| 2008/0022012 A1 | 1/2008 | Wang |
| 2008/0040768 A1 | 2/2008 | Robotham |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0103903 A1 | 5/2008 | Flake et al. |
| 2008/0109823 A1 | 5/2008 | Whitfield et al. |
| 2008/0109857 A1 | 5/2008 | Goodwill et al. |
| 2008/0115166 A1 | 5/2008 | Bhogal et al. |
| 2008/0130495 A1 | 6/2008 | Dos Remedios |
| 2008/0134156 A1 | 6/2008 | Osminer et al. |
| 2008/0134165 A1 | 6/2008 | Anderson et al. |
| 2008/0141317 A1 | 6/2008 | Radloff et al. |
| 2008/0147497 A1 | 6/2008 | Tischer |
| 2008/0152116 A1 | 6/2008 | Sylvain |
| 2008/0152316 A1 | 6/2008 | Sylvain |
| 2008/0155059 A1 | 6/2008 | Hardin et al. |
| 2008/0177998 A1 | 7/2008 | Apsangi et al. |
| 2008/0192820 A1 | 8/2008 | Brooks et al. |
| 2008/0201748 A1 | 8/2008 | Hasek et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0313691 A1 | 12/2008 | Cholas et al. |
| 2009/0025027 A1 | 1/2009 | Craner |
| 2009/0028182 A1 | 1/2009 | Brooks et al. |
| 2009/0030802 A1 | 1/2009 | Plotnick et al. |
| 2009/0132346 A1 | 5/2009 | Duggal et al. |
| 2009/0162033 A1 | 6/2009 | Del et al. |
| 2009/0187939 A1 | 7/2009 | Lajoie |
| 2009/0210899 A1 | 8/2009 | Lawrence-Apfelbaum et al. |
| 2009/0210912 A1 | 8/2009 | Cholas et al. |
| 2009/0254971 A1 | 10/2009 | Herz et al. |
| 2009/0320059 A1 | 12/2009 | Bolyukh |
| 2010/0057560 A1 | 3/2010 | Skudlark et al. |
| 2010/0058406 A1 | 3/2010 | Xu et al. |
| 2010/0115060 A1 | 5/2010 | Julia et al. |
| 2010/0157928 A1 | 6/2010 | Spinar et al. |
| 2010/0161492 A1 | 6/2010 | Harvey et al. |
| 2010/0223491 A1 | 9/2010 | Ladd et al. |
| 2010/0251304 A1 | 9/2010 | Donoghue et al. |
| 2010/0251305 A1 | 9/2010 | Kimble et al. |
| 2010/0262488 A1 | 10/2010 | Harrison et al. |
| 2010/0269131 A1 | 10/2010 | Newberry et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0119703 A1 | 5/2011 | Schlack et al. |
| 2011/0178880 A1 | 7/2011 | Karaoguz et al. |
| 2011/0231265 A1 | 9/2011 | Brown et al. |
| 2011/0307339 A1 | 12/2011 | Russell et al. |
| 2011/0317977 A1 | 12/2011 | Harris |
| 2012/0011269 A1 | 1/2012 | Krikorian et al. |
| 2012/0023522 A1 | 1/2012 | Anderson et al. |
| 2012/0042331 A1 | 2/2012 | Wolf, Sr. |
| 2012/0084813 A1 | 4/2012 | Dmitriev et al. |
| 2012/0110620 A1 | 5/2012 | Kilar et al. |
| 2012/0159539 A1 | 6/2012 | Berberet et al. |
| 2012/0224834 A1 | 9/2012 | Chen et al. |
| 2012/0278841 A1 | 11/2012 | Hasek et al. |
| 2013/0133009 A1 | 5/2013 | Bhogal et al. |
| 2013/0227608 A1 | 8/2013 | Evans et al. |
| 2013/0290556 A1* | 10/2013 | Giladi .................. H04N 21/812 709/231 |
| 2013/0325870 A1 | 12/2013 | Rouse et al. |
| 2013/0330063 A1 | 12/2013 | Bonovich et al. |
| 2014/0020017 A1 | 1/2014 | Stern et al. |
| 2014/0157313 A1 | 6/2014 | Shartzer et al. |
| 2014/0164760 A1 | 6/2014 | Hybertson et al. |
| 2014/0208349 A1 | 7/2014 | Nair et al. |
| 2014/0282777 A1 | 9/2014 | Gonder et al. |
| 2017/0164378 A1 | 6/2017 | Gunasekara et al. |
| 2017/0164416 A1 | 6/2017 | Yeddala et al. |
| 2018/0014041 A1 | 1/2018 | Chen et al. |

FOREIGN PATENT DOCUMENTS

| | | |
|---|---|---|
| WO | WO-0191474 A2 | 11/2001 |
| WO | WO-2004008693 A1 | 1/2004 |
| WO | WO-2007136399 A1 | 11/2007 |
| WO | WO-2008016786 A1 | 2/2008 |

OTHER PUBLICATIONS

Deering, S., et al., "Internet Protocol, Version 6 (IPv6) Specification", Internet Engineering Task Force (IETF), Dec. 1998, 39 pages.

"DOCSIS 3.0 Management Features Differences Technical Report" CM-TR-MGMT V3.0-DIFF-V01-071228, 2007, 62 pages.

"DOCSIS 3.0 OSSI Configuration Management Technical Report" CM-TR-OSSlv3.0-CM-V01-080926, 2008, 84 pages.

Griffith D.W., et al., "Resource Planning and Bandwidth Allocation in Hybrid Fiber-Coax Residential Networks," National Institute of Standards and Technology (NIST), Oct. 1, 2005, 10 pages.

Inter alia, Section 6.5 of SCTE Standard SCTE 35 2016.

"Internet Protocol, DARPA Internet Program, Protocol Specification", IETF RCF 791, Sep. 1981, 50 pages.

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, copyright 2001.

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, (http://www.imake.com/hopenvision).

* cited by examiner

TABLE 5 - SPLICE_INFO_SECTION()

| SYNTAX | BITS | MNEMONIC | ENCRYPTED |
|---|---|---|---|
| SPLICE_INFO_SECTION() { | | | |
|     TABLE_ID | 8 | UIMSBF | |
|     SECTION_SYNTAX_INDICATOR | 1 | BSLBF | |
|     PRIVATE_INDICATOR | 1 | BSLBF | |
|     RESERVED | 2 | BSLBF | |
|     SECTION_LENGTH | 12 | UIMSBF | |
| PROTOCOL_VERSION | 8 | UIMSBF | |
| ENCRYPTED_PACKET | 1 | BSLBF | |
| ENCRYPTION_ALGORITHM | 6 | UIMSBF | |
| PTS_ADJUSTMENT | 33 | UIMSBF | |
| CW_INDEX | 8 | UIMSBF | |
| TIER | 12 | BSLBF | |
| SPLICE_COMMAND_LENGTH | 12 | UIMSBF | |
| SPLICE_COMMAND_TYPE | 8 | UIMSBF | E |
| IF(SPLICE_COMMAND_TYPE==0X00) | | | |
|     SPLICE_NULL() | | | E |
| IF(SPLICE_COMMAND_TYPE==0X04) | | | |
|     SPLICE_SCHEDULE() | | | E |
| IF(SPLICE_COMMAND_TYPE==0X05) | | | |
|     SPLICE_INSERT() | | | E |
| IF(SPLICE_COMMAND_TYPE==0X06) | | | |
|     TIME_SIGNAL() | | | E |
| IF(SPLICE_COMMAND_TYPE==0X07) | | | |
|     BANDWICH_RESERVATION() | | | E |
| IF(SPLICE_COMMAND_TYPE==0XFF) | | | |
|     PRIVATE_COMMAND() | | | E |
|     DESCRIPTOR_LOOP_LENGTH | 16 | UIMSBF | E |
| FOR(I=0; I<N1; I++) | | | |
|     SPLICE_DESCRIPTOR() | | | |
| FOR(I=0; I<N2; I++) | | | |
|     ALIGNMENT_STUFFING | 8 | BSLBF | E |
| IF(ENCRYPTED_PACKET) | | | |
|     E_CRC_32 | 32 | RPCHOF | E |
| CRC_32 | 32 | RPCHOF | |

FIG. 2C

PRIOR ART

APPARATUS AND METHODS FOR SELECTIVE SECONDARY CONTENT INSERTION IN A DIGITAL NETWORK

PRIORITY

This application is a divisional of and claims priority to co-owned U.S. patent application Ser. No. 15/347,665 filed on Nov. 9, 2016 entitled "APPARATUS AND METHODS FOR SELECTIVE SECONDARY CONTENT INSERTION IN A DIGITAL NETWORK," and issuing as U.S. Pat. No. 10,911,794 on Feb. 2, 2021, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content data delivery over a network. More particularly, the present disclosure is related in one exemplary aspect to apparatus and methods for secondary content (e.g., advertising, promotions, etc.) management and provision within a managed content distribution network such as a cable, satellite, or hybrid fiber/copper (HFCu) distribution network.

2. Description of Related Technology

In the context of network services, it is often highly desirable to provide users or subscribers of the network with ready and instant access to a variety of different types of content (e.g., linear or broadcast content, video-on-demand (VOD), "start-over", streaming media, etc.), accessible at different locations, and on different platforms (e.g., via set-top box, smart-TV, tablet or smartphone, etc.). In many cases, it is also desirable to provide the same users with "secondary" content (such as e.g., advertisements, promotions or "info-mercials", related shorts, telescoping information/advertisements, hyperlinks, etc.). The secondary content may be directly or indirectly related to the "primary" content which the user selected in the first place (such as via a common theme or context, common persons of interest, common demographic factors, etc.), or can be totally unrelated.

Delivery of secondary content may comprise a major source of revenue for commercial television or movie distributors, and for the network operator. For example, where the secondary content comprises advertisements, it may be a main source of income for national television broadcasters and their local over-the-air affiliates. Cable, satellite, HFCu, and other content distribution networks, as well as Internet content providers, also derive income from the sale of advertising time and insertion opportunities (and "impressions" associated therewith).

Moreover, an advertiser may seek to maximize the return on their advertising investment by targeting specific users or groups of users that are likely to be most receptive to the commercial message embodied in the advertisements. The aforementioned selective "targeting" and delivery of content to e.g., subscribers in a cable or other MSO-based network is generally well known in the prior art. For example, it may be desirable to include certain types of advertising at specific demographic or geographic segments of an MSO's subscriber base. One way of targeting viewers involves selecting advertisements based on a geographical region in which the advertisement is to be delivered; i.e., a so-called "advertisement zone". In other words, it is advantageous to provide certain advertising content to viewers in one local or regional area which is different than that provided to the viewers in a different local or regional area.

For example, the advertisements may be limited by the geographic area in which a business operates. Hence, it typically only makes financial sense for an advertisement for that business to be provided in geographical areas where the business is operated or provides services. Similar logic applies to the demographic, psychographic, and other planes; e.g., an advertisement for a super-high end sports car would likely be wasted when delivered to lower- or middle-class households or subscribers (which may or may not be correlated to geography), as would an advertisement for a feminine product delivered to a predominantly male audience. Additionally, the context of the primary content may not be compatible with particular types/themes of secondary content (e.g., a VOD movie having a non-violent theme might not mesh optimally with advertisements for UFC sporting or boxing events, regardless of demographics or geography).

One technique for advertising comprises use of so-called "audience bundles". Typically, such audience bundles are built to reach a certain demographic group. Audience bundles are useful when a client (e.g., advertiser) has a defined demographic or other target, and wants assurance that their audience is being reached with a certain level of frequency.

One problem commonly encountered in the foregoing scenarios relates to delivery of particularly relevant content to particular users, and at particular times or relative chronological reference points. Typical prior art linear advertising delivery approaches (including the aforementioned "bundles") typically have a very low degree of granularity in terms of the target audience; i.e., they may have some degree of applicability to some of the people watching the advertisement, but more often than not have little or no applicability to a majority of users watching the advertisement, and hence in effect are largely wasted on such viewers. Such low "applicability density" has obvious drawbacks, including lack of efficacy at reaching desired subsets of subscribers, unnecessary network resource consumption, and user frustration (at having to be exposed to advertisements in which they have no interest).

One salient reason for the foregoing lack of applicability of advertising is the inability to particularly target it to one individual (or a constrained subset of individuals). Given so many geographically and demographically diverse subscribers within a typical MSO's subscriber pool, even broadly watched advertisements (e.g., during a contentious Presidential debate or the NFL's Super Bowl) may really have applicability to only a relatively small number of subscribers, despite being seen by tens of millions of people. Like snowflakes, every subscriber/household is ostensibly different in some way, and hence in theory the optimal degree of penetration for advertising is via advertisements which are uniquely targeted (or at least their applicability confirmed) for each user.

Yet determining not only (i) unique attributes or prospective interests of a given user, and (ii) insertion opportunities when in fact that user is watching and is engaged (i.e., ostensibly paying attention) is extremely challenging at very least. One could conceivably flood delivery channels (e.g., in-band QAMs) with a plethora of advertising applicable to any number of different demographics/psychographics, such that something at least partly relevant to most users was always present, but such approach is both horribly inefficient from a bandwidth/network resource conservation perspective, and still suffers from the disability of how one would identify and steer a given user to something at least generally relevant to them which was then being delivered over the network.

Moreover, sometimes the best efficacy of an advertisement is when it is also contextually relevant; e.g., relates to subject matter the particular subscriber is watching when the advertisement is presented, and/or relates to a present geographic, psychographic, or other context then-relevant to the subscriber (e.g., when the subscriber is in Paris on vacation, or has recently returned therefrom, advertisements in some way contextually related to France or French culture may be particularly interesting to that subscriber).

Prior art Internet "banner" ads are one technique for attempting to divine a user's interest or context; i.e., by evaluating historical visits or clicks of the user on certain topical advertisements or websites. However, such approaches are fraught with potential issues, and largely inapplicable to the aforementioned MSO subscriber or other on-demand user context for a variety of reasons, including for instance: (i) the user may not interact with any links or websites from which useful information can be gleaned (e.g., they may simply tune to a given MSO channel without other interaction); (ii) the user may have merely inadvertently selected a given link or site, such as by a small finger placement error on their tablet or smartphone capacitive touchscreen; and (iii) the user may merely be expressing "morbid curiosity" as it were for something they find offensive or actually dislike. Hence, such approaches have little if any power in making objective assessment of a subscriber's demographic or psychographic profile. Rather, fact-based data relating to, inter alia, longer term decisions or activities of the user such as buying or refinancing a house, buying or leasing a car, traveling to certain locations, purchasing certain items, dining out at certain restaurants, investing in certain investment vehicles, subscribing to certain services or packages (including those of the MSO), etc. are often far more telling and accurate depictions of a given subscriber (and/or household) than that obtained from any anecdotal "click-based" sources.

Yet further, the broad variety of different delivery paradigms and target platforms further complicates targeting of secondary content. As indicated above, the typical MSO network includes both linear (e.g., broadcast, and non-repeatable) content, as well as non-linear content such as streaming IP-based content, VoD, cDVR, start-over, and the like, each of which raise their own particular insertion opportunity and delivery issues. For example, a linear broadcast schedule may be known well in advance of actual broadcast, whereas a stream-based on-demand delivery modality (e.g., VoD, or web streaming to a user portable device over the MSO's web portal or the like) may be completely spurious, and may stop and start again unpredictably, such as when the user is interrupted or wants to watch the remainder of a program at a later time.

Similarly, the subscriber's context using one type of delivery mode versus another may vary; e.g., in the foregoing Paris example, the user may only have online streaming available to them via an Internet connection when in Paris, whereas both online streaming and other modalities (e.g., in-band broadcast delivery via QAM to their digital set top box (DSTB), as well as VoD, start-over, etc.) may be available when they are home.

Based on the foregoing, there is a salient need for improved methods and apparatus for delivering targeted secondary content within a content distribution network. Such improved apparatus and methods would ideally, in exemplary implementations, enable delivery of geographically, demographically, and/or psychographically relevant secondary content to particular users or subsets of users, and would be based at least partly on some verifiable data or profile of the user(s), and would also be implemented without consuming disproportionate amounts of network resources. Such improved method and apparatus would also ideally be adaptable or able to delivery over different content distribution paradigms, including both linear and non-linear modalities.

SUMMARY

The present disclosure addresses the foregoing needs by disclosing, inter alia, apparatus and methods for secondary content selection and insertion within a content distribution network infrastructure.

In one aspect of the disclosure, a computerized method of delivering secondary content in a content distribution network is disclosed. In one embodiment, the method includes: identifying one or more secondary content elements applicable to a target population of users of the content distribution network; identifying one or more insertion opportunities within programming consumed by the target population; causing delivery of the one or more secondary content elements at one or more of the identified insertion opportunities via selective switching; and causing one or more receiving devices of the target population to access the selectively switched one or more secondary content elements for at least a period of time.

In one variant, the selective switching comprises switching the one or more secondary content elements into delivery via a switching apparatus disposed at a non-central distribution node of the network, the switching into delivery occurring substantially contemporaneous with a start of the identified one or more insertion opportunities. The switching apparatus disposed at a non-central distribution node of the network comprises for example an edge switch of a switched digital video (SDV) delivery architecture.

In another variant, the target population comprises an individual subscriber or household of the network, and the identifying one or more secondary content elements applicable to the target population includes: accessing at least a network-side repository of data for data relating to attributes of the individual or subscriber; and utilizing at least the accessed data relating to attributes to correlate the attributes to corresponding aspects of the one or more secondary content elements.

In a further variant, the target population comprises an individual subscriber or household of the network, and the identifying one or more insertion opportunities within programming consumed by the target population comprises receiving from an application computer program or middleware component operative to run on a receiving device of the individual subscriber or household a communication indicating the one or more insertion opportunities within the consumed programming.

In one implementation, the causing one or more receiving devices of the target population to access the selectively switched one or more secondary content elements for at least a period of time comprises transmitting a communication to respective software processes operative on the one or more receiving devices, the transmitted communication causing the respective software processes to instigate a tune, at a prescribed time, from a current QAM channel to another QAM channel, the another QAM channel carrying the one or more secondary content elements.

In a second aspect of the disclosure, a computerized method of operating a content distribution network is disclosed. In one embodiment, the method includes: identifying one or more secondary content elements applicable to a target population of users of the content distribution network; identifying one or more insertion opportunities within programming consumed by the target population, the programming delivered over a first modulated radio frequency (RF) channel; causing delivery of the one or more secondary content elements at one or more of the identified insertion opportunities via selective switching of the one or more secondary content elements onto a second modulated RF channel; causing one or more receiving devices of the target population to access the selectively switched one or more secondary content elements via the second RF channel; and subsequently causing the one or more receiving devices accessing the selectively switched one or more secondary content elements to cease accessing the one or more secondary content elements and return to accessing the programming via the first RF channel. In one variant, upon a completion of the one or more secondary content elements, removal of delivery of the one or more content elements via the second modulated RF channel is performed.

In another variant, at least the (i) causing delivery via selective switching, and (ii) causing removal, cooperate to minimize use of the bandwidth.

In a further variant, the method further comprising causing, during at least a portion of delivery of the one or more secondary content elements, removal of at least part of the programming from the first modulated RF channel. For example, in one implementation, during at least a portion of the removal of at least part of the programming from the first modulated RF channel, delivery of alternate programming via the first modulated RF channel is provided.

In another aspect of the disclosure, computer readable apparatus is disclosed. In one embodiment, the apparatus includes a non-transitory storage medium, the non-transitory medium comprising at least one computer program having a plurality of instructions, the instructions configured to, when executed on a processing apparatus: obtain first data relating to one or more present or future available advertising insertion opportunities within a programming content stream being delivered over a content distribution network; receive a communication from a network side process, the communication comprising data indicating a channel to which to tune for delivery of advertising appropriate for the one or more opportunities; and cause tuning of a receiver apparatus to the channel at a prescribed time associated with the one or more insertion opportunities to access the appropriate advertising.

In one variant, the plurality of instructions are further configured to obtain second data identifying at least a receiver device of a user of the content distribution network, and transmit at least a portion of the second data to a second network-side process. The second network-side process is configured, for example, to utilize the second data to access a network account database, the database comprising a plurality of data relating to demographic factors associated with an account with which the receiver device is associated.

In another variant, the at least one computer program further comprises a computer program configured to: generate impression data relating to a receiver device on which the at least one computer program is operative to run, the impression data based at least on functional activity within the receiver device during use; and cause transmission of the impression data to a network-side process via a communication channel. For example, in one implementation, the causation of tuning of a receiver apparatus to the channel to receive the appropriate advertising comprises accessing an application programming interface (API) associated with middleware of the receiver device, the API configured to cause the receiving apparatus to tune to a particular radio frequency (RF) channel at the prescribed time.

In one particular configuration, the receipt of the communication from a network side process is performed using an in-band RF channel of the network, and the transmission of the impression data is performed using an out-of-band (OOB) communication channel of the network, e.g., one that utilizes a connection-less communication protocol.

In another variant, the at least one computer program further comprises logic configured to: detect that, after the tuning to the channel, the appropriate advertising is not present or available on the channel; and obtain an alternate channel to which to tune the receiver apparatus so as to access second appropriate advertising, and take corrective action based thereon; e.g., select second appropriate advertising so as to fit within the remaining time period.

In a further aspect of the disclosure, computerized network apparatus is disclosed. In one embodiment, the apparatus is configured for substantially automated insertion of secondary content for use by one or more users of a managed content distribution network, and includes server apparatus comprising: processor apparatus; first network interface apparatus in data communication with the processor apparatus configured to communicate with a secondary content processing entity of the managed content distribution network; second network interface apparatus in data communication with the processor apparatus and configured to communicate with one or more network entities configured to select appropriate secondary content for respective ones of the plurality of user receiver devices; third network interface apparatus in data communication with the processor apparatus configured to communicate with a plurality of user receiver devices via at least one or more communication channels of the managed content distribution network; and storage apparatus in data communication with the processor apparatus, the storage apparatus comprising at least one computer program.

In one variant, the at least one computer program is configure to, when executed on the processor apparatus: receive, via the first network interface apparatus, indication of an impending insertion opportunity within a program stream being accessed by a particular one of the plurality of receiver devices; receive, via the second network interface apparatus, data indicative of a communication channel over which the particular one receiver device can access secondary content, the secondary content having been determined to be applicable to that particular one receiver device; and transmit, via the third interface, at least a portion of the data indicative of the communication channel to an insertion process of the network, for insertion thereof by the insertion process within the program stream.

In one implementation, the indication of an impending insertion opportunity within a program stream being accessed by a particular one of the plurality of receiver devices comprises an SCTE-35 compliant cue issued by a program network entity that is the source of the program stream, and the communication channel comprises a radio frequency (RF) QAM channel accessible to the particular one of the receiver devices via a switched digital video (SDV) switching device of the content distribution network. Insertion of the at least portion of the data by the insertion process within the program stream comprises insertion into a program mapping table (PMT) via a splicing process of the content distribution network.

In another embodiment, the computerized network apparatus is configured for substantially automated selection and insertion of secondary content, and includes: first server apparatus comprising: processor apparatus; first network interface apparatus in data communication with the processor apparatus and configured to communicate with a receiver evaluation entity; second network interface apparatus in data communication with the processor apparatus and configured to communicate with a second server apparatus configured to select appropriate secondary content for respective ones of the plurality of user receiver devices; and storage apparatus in data communication with the processor apparatus, the storage apparatus comprising at least one computer program. In one implementation, the computer program is configured to, when executed: receive from the receiver evaluation entity via the first network interface apparatus, data relating to one or more of the plurality of receiver devices; and transmit, via the second interface, at least a portion of the data relating to the one or more receiver devices for use by the second server apparatus to select appropriate secondary content.

In another embodiment, the network apparatus further includes a second server apparatus comprising: processor apparatus; first network interface apparatus in data communication with the processor apparatus of the second server apparatus and configured to communicate with the first server apparatus; second network interface apparatus in data communication with the processor apparatus of the second server apparatus and configured to communicate with a third server apparatus; and storage apparatus in data communication with the processor apparatus of the second server apparatus, the storage apparatus comprising at least one computer program. In one variant, the at least one computer program is configured to, when executed: receive from the first server apparatus the at least portion of the data relating to one or more of the plurality of receiver devices; utilize the received at least portion of the data to generate one or more secondary content selections appropriate to the one or more receiver devices; obtain the one or more selected secondary content; and transmit, via the second interface, at least a portion of the selected and obtained secondary content, to the third server apparatus.

In another embodiment, the network apparatus includes a third server apparatus having: processor apparatus; first network interface apparatus in data communication with the processor apparatus of the third server apparatus and configured to communicate with a secondary content processing entity of the managed content distribution network; second network interface apparatus in data communication with the processor apparatus of the third server apparatus and configured to communicate with the second server apparatus to receive the at least portion of the selected secondary content appropriate to the one or more receiver devices; third network interface apparatus in data communication with the processor apparatus configured to communicate with a plurality of user receiver devices via at least one or more communication channels of the managed content distribution network; and storage apparatus in data communication with the processor apparatus of the third server apparatus, the storage apparatus comprising at least one computer program. In one implementation, the at least one computer program is configured to, when executed: receive, via the first network interface apparatus, indication of an impending insertion opportunity within a program stream being accessed by a particular one of the plurality of receiver devices; receive, via the second network interface apparatus, data indicative of a communication channel over which the particular one receiver device can access secondary content, the secondary content having been determined to be applicable to that particular one receiver device; transmit, via the third interface, at least a portion of the data indicative of the communication channel to an insertion process of the network, for insertion thereof by the insertion process within the program stream; and subsequently transmit, via the third interface, at least a portion of the received secondary content for insertion thereof by the insertion process within the program stream.

In another aspect of the disclosure, a computerized method of delivering secondary content in a content distribution network is described. In one embodiment, the method includes: receiving a message indicate of an impending event within a program stream; based at least on the received first message, generating a second message and transmitting the second message to a network secondary content management process to alert the secondary content management process of the impending event; based at least on the second message, generating via the secondary content management process a third message relating at least to one or more source channels over which secondary content is to be delivered, and transmitting the third message to an insertion process; inserting, via the insertion process and based at least on the third message, data relating to the one or more source channels into one or more primary content streams; based on a start of the impending event, generating a fourth message and transmitting the fourth message to the secondary content management process; based at least on the fourth message, generating via the secondary content management process a fifth message relating at least to the start of the event, and transmitting the fifth message to an insertion process; inserting, via the insertion process and based at least on the fifth message, data indicative of the start of the event into the one or more primary content streams; and causing transmission of the secondary content via the one or more source channels.

In one variant, the method further includes: generating via the secondary content management process a sixth message relating at least to an end of the event, and transmitting the sixth message to an insertion process; inserting, via the insertion process and based at least on the sixth message, data indicative of the end of the event into the one or more primary content streams; and causing cessation of transmission of the secondary content via the one or more source channels. In one implementation, the method yet further includes receiving via an out-of-band (OOB) channel of the network, data indicative of a receiver device having tuned to the one or more source channels to receive the secondary content.

In another variant, the first message comprises an SCTE-35-compliant message; the second message comprises a simple network message protocol (SNMP) trap message; the third message comprises a client break message; the fourth message comprises a second SNMP trap message; and the fifth and sixth messages each comprise a client trigger message.

In another aspect of the disclosure, a computerized method of accessing secondary content via a client device of a content distribution network is described. In one embodiment, the method includes: receiving a program stream via at least a first radio frequency (RF) channel of the network; extracting data from the program stream relating at least to one or more source RF channels over which secondary content is to be delivered; storing the extracted data in a data structure; receiving a trigger event via the program stream; based at least on the received trigger event, causing access of the data structure to obtain at least a portion of the extracted data; utilizing the obtained extracted data to identify a second radio frequency channel to which to tune a receiver apparatus of the client device; and causing tuning of the receiver apparatus to the second RF channel to access a program stream carrying the secondary content.

In another aspect of the disclosure, a computerized decision "engine" is disclosed. In one embodiment, the engine comprises a plurality of computer algorithms operative to run on a computerized platform (e.g., client device such as set-top box or portable tablet computer or smartphone) and configured to extract data from in-band program streams received by the device over a network, store the extracted data, and utilize the stored data to access targeted secondary content via a switched digital video delivery model.

In a further aspect, a data architecture is disclosed.

In a further aspect, a network architecture for use within a managed content distribution network is disclosed.

These and other aspects of the disclosure shall become apparent when considered in light of the detailed description provided herein.

BRIEF DESCRIPTION OF THE DRAWINGS

FIG. 2c is a tabular representation of various exemplary digital program insertion (DPI) information parameters of the splice_info_section according to SCTE 35 2016.

Figure 1:
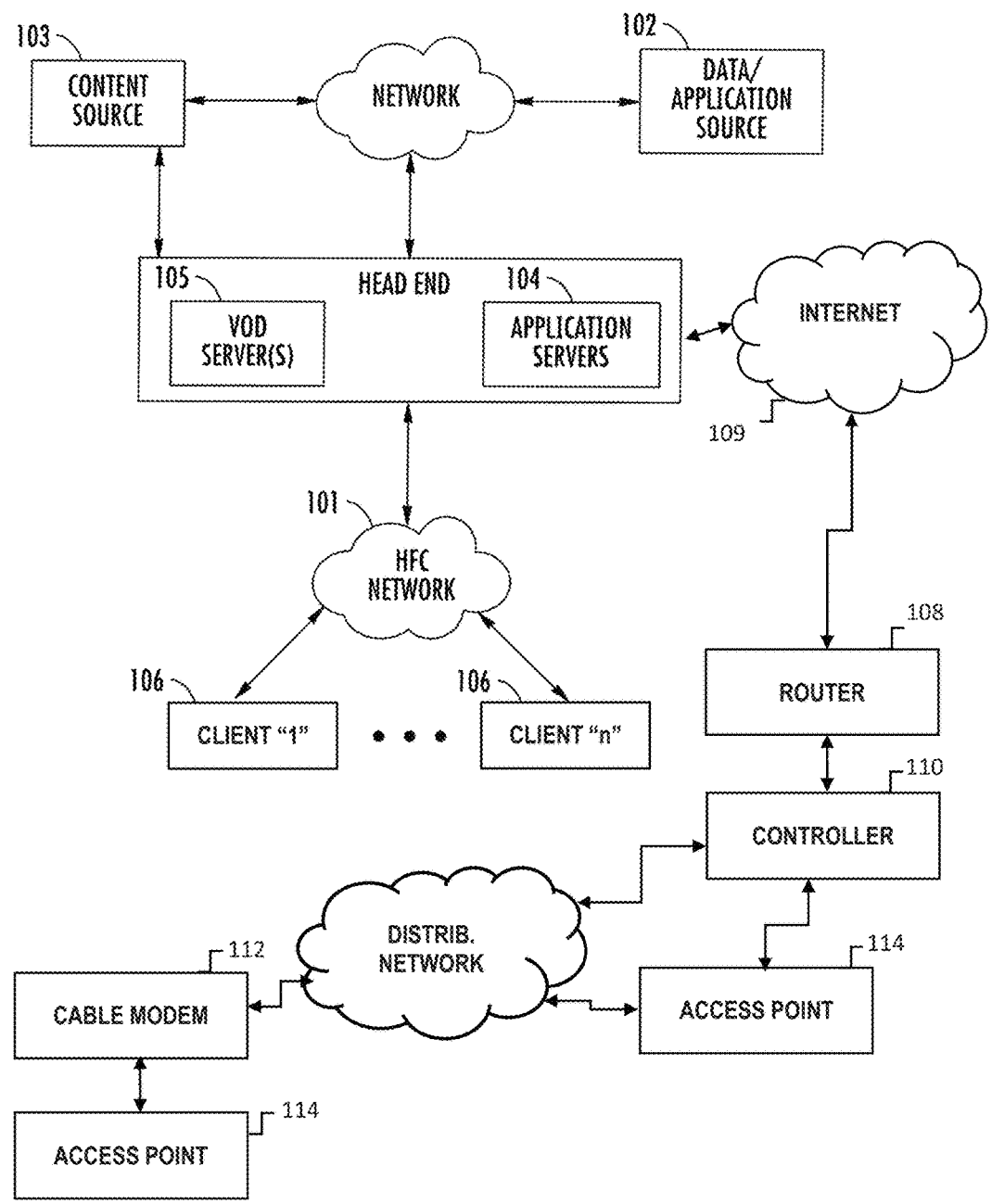
FIG. 1 is a functional block diagram illustrating an exemplary hybrid fiber/coax (HFC) cable network configuration useful with the present disclosure.

All figures © Copyright 2016 Charter Communications, Inc. All rights reserved.

DETAILED DESCRIPTION

Reference is now made to the drawings wherein like numerals refer to like parts throughout.

As used herein, the term "advertising zone" may include the delivery of advertisements, promotions, or other secondary content with an actual geographic zone, a demographic "zone" or logical space, a psychographic zone or logical space, a user-based preference space, a primary/secondary content context space, and so forth.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, digital set-top boxes (e.g., DSTBs), personal computers (PCs), and minicomputers, whether desktop, laptop, or otherwise, and mobile devices such as handheld computers, tablets, phablets, personal digital assistants (PDAs), personal media devices (PMDs), and smartphones.

As used herein, the term "computer program" or "software" is meant to include any sequence or human or machine cognizable steps which perform a function. Such program may be rendered in virtually any programming language or environment including, for example, Python, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), C#, and the like.

The terms "consumer premises equipment" (CPE) and "consumer device" refer without limitation to any type of electronic equipment for use within a consumer's or user's premises and connected to a content distribution network. The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

As used herein, the term "database" refers generally to one or more tangible or virtual data storage locations, which may or may not be physically co-located with each other or other system components.

As used herein, the term "DOCSIS" refers to any of the existing or planned variants of the Data Over Cable Services Interface Specification, including for example DOCSIS versions 1.0, 1.1, 2.0, 3.0 and 3.1. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose complex instruction set computing (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the term "network content provider" refers generally and without limitation to any content service provider or content-providing logical "network" such as e.g., ABC, NBC, CBS, etc., regardless of delivery platform or underlying content distribution network infrastructure (see below).

As used herein, the terms "network" and "bearer network" (distinguished from "network content provider" supra) refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., LTE/LTE-A, 3GPP, 3GPP2, UMTS), or IrDA families.

As used herein, the terms "personal media device" and "PMD" refer to, without limitation, any device, whether portable or otherwise, capable of storing and/or rendering media.

As used herein, the term "secondary content" refers without limitation to content other than primary programming content, such as e.g., advertisements, promotions, "telescoping" content, info-mercials, trailers, icons or animated overlays, etc. which may be presented either alone or in conjunction with the primary (or yet other) content.

As used herein, the term "server" refers to, without limitation, any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v/ac or 802.11-2012, as well as so-called "Wi-Fi Direct", each of the foregoing incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee, RFID/NFC, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present disclosure provides apparatus and methods for substantially automatically selecting and inserting secondary content (e.g., advertising)

which is particularly targeted to one or more users of a managed content distribution network such as a cable, satellite, of HFCu network.

In one exemplary embodiment, the methods an apparatus disclosed herein leverage extant network infrastructure, including so-called "switched digital video" or SDV capability, to efficiently identify insertion opportunities within programming or other content being delivered to the targeted user(s), select appropriate advertising content, and cause placement of the advertising content onto an SDV channel accessible by the targeted user(s). In one implementation, a software component (decision engine) resident on each user's set-top box or other media receiver communicates with network-side entities to identify the placement opportunities, and receive device-specific "targeting" instructions (e.g., particular SDV RF channels and related data) for use in conjunction with the identified opportunities. Upon reaching the targeted insertion opportunity, the software utilizes extant interfaces (e.g., middleware on the set-top box) to cause tuning of the device to the appropriate SDV channel at the appropriate time, and subsequent tuning back to the (primary) content program stream upon completion of the advertisement.

In another implementation, the client-side decision engine is configured with additional intelligence, such that it can use audience segmentation profiles or other data to indigenously correlate certain available secondary content with a particular receiver device or household, in effect making the targeting decision locally.

Notably, in the exemplary embodiment, the targeted advertisements are only placed onto the relevant SDV channel when they are needed (e.g., there is an opportunity and an advertisement relevant to the particular targeted receiver device and which fits within the allotted time), and in a "just-in-time" fashion, so that bandwidth consumption within the network is minimized. Economies of scale may also be created where multiple different users are viewing the same primary program stream, and have similar demographic and/or psychographic profiles wherein a common advertisement can be used for each; in such cases, multiple users can be tuned (by their respective software components) to a common SDV channel to simultaneous receive the targeted advertisement(s).

In alternate embodiments, targeted advertising is delivered via IP-based streaming to a user's IP-enabled mobile device or Smart TV via the MSO's data services. In one such implementation, the user's IP-enabled device is equipped with a an application program (decision engine comparable to that described above) receives notification via the IP streaming media of insertion opportunities; the decision engine then instructs the IP-enabled device to access a URL of a secondary content source (e.g., third party web server) where appropriate secondary content for the IP-enabled device (and/or associated subscriber or household) is available. Upon completion, the media stream is switched back to the primary content URL.

Advantageously, some exemplary embodiments of the present disclosure also maximally leverage extant network advertising and other infrastructure, thereby making upgrade or addition of the various described functionalities substantially "drop in", and obviating significant component retrofits or replacement (i.e., much is accomplished via software/firmware updates or downloads).

DETAILED DESCRIPTION OF EXEMPLARY EMBODIMENTS

Exemplary embodiments of the apparatus and methods of the present disclosure are now described in detail. While these exemplary embodiments are described in the context of a managed content distribution network (e.g., hybrid fiber coax (HFC) cable) architecture having a multiple systems operator, digital networking capability, and plurality of client devices/CPE, and Internet delivery via e.g., RF QAM and DOCSIS cable modem, the general principles and advantages of the disclosure may be extended to other types of networks, architectures and applications, whether broadband, narrowband, wired or wireless, terrestrial or satellite, managed or unmanaged (or combinations thereof), or otherwise, the following therefore being merely exemplary in nature.

It will also be appreciated that while described generally in the context of a network providing service to a customer or consumer or end user (i.e., residential), the present disclosure may be readily adapted to other types of environments including, e.g., commercial/retail, or enterprise domain (e.g., businesses), and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (Ipv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure, including improvements to computerized technology, will immediately be recognized by persons of ordinary skill in the art with reference to the attached drawings and detailed description of exemplary embodiments as given below.

Managed Service Provider Network—

FIG. 1 illustrates a typical service provider network configuration useful with the features of the automated secondary content selection and insertion system described herein. The various components of the exemplary embodiment of the network 100 include (i) one or more data and application origination sources 102; (ii) one or more content sources 103, (iii) one or more application distribution servers 104; (iv) one or more VOD servers 105, (v) client devices and/or Customer Premises Equipment (CPE) 106, (vi) one or more routers 108, (vii) one or more wireless access point controllers 110 (may be placed more locally as shown or in the headend or core" portion of network), (viii) one or more cable modems 112, and/or (ix) one or more access points 114. The distribution server(s) 104, VOD servers 105 and CPE/client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1a (described in greater detail below), or others, may be used.

Figure 1A:
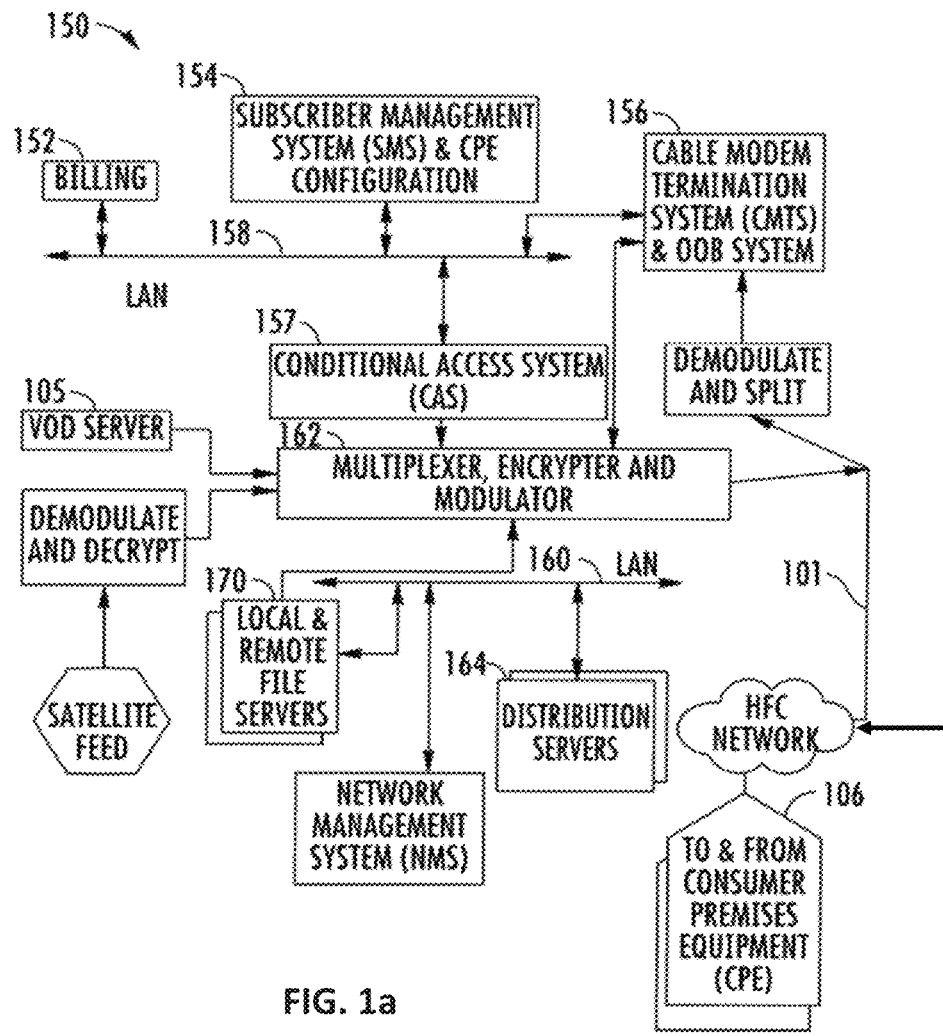
FIG. 1a is a functional block diagram illustrating one exemplary HFC cable network headend configuration useful with the present disclosure.
Figure 1A:
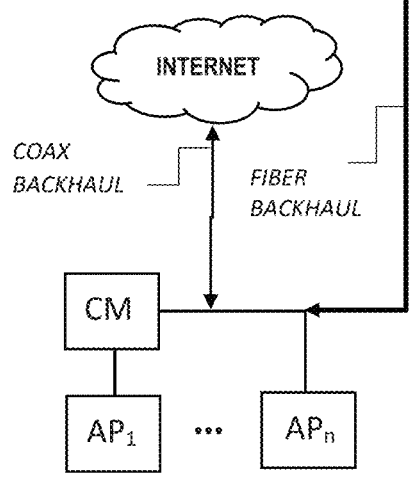

FIG. 1a shows one exemplary embodiment of a headend architecture. As shown in FIG. 1a, the headend architecture 150 comprises typical headend components and services including billing module 152, subscriber management system (SMS) and client/CPE configuration management module 154, cable modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Moreover, the functions described below with respect to FIGS. 2-3 can be (i) co-located at one or more centralized locations within the network (e.g., at one or more regional headends, or national "super" headends), (i) distributed throughout various disparate locations of the MSO-managed network; or (iii) distributed at various locations within and external to the MSO-managed network (e.g., use assets, sources, etc. which are maintained by one or more third party data sources or providers).

Figure 1B:
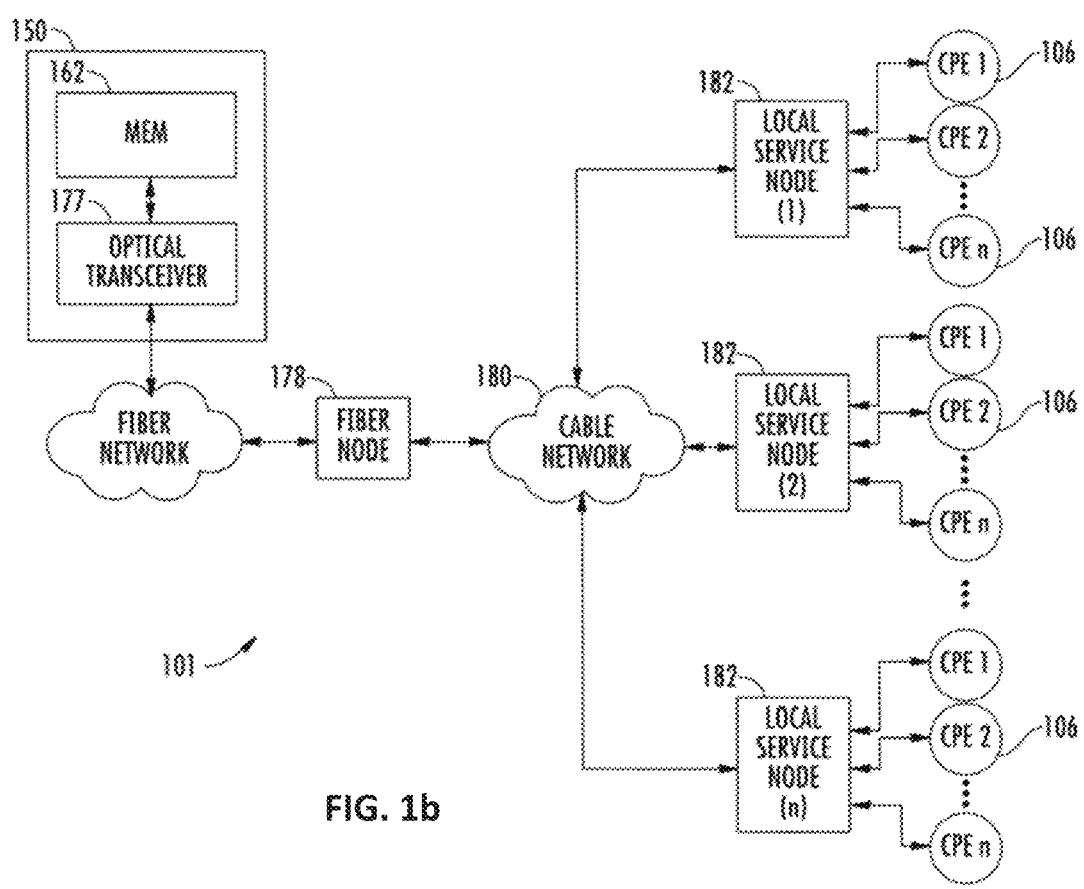
FIG. 1b is a functional block diagram illustrating one exemplary local service node configuration useful with the present disclosure.

The exemplary architecture 150 of FIG. 1a further includes a conditional access system (CAS) 157 and a multiplexer-encrypter-modulator (MEM) 162 coupled to the HFC network 101 adapted to process or condition content (including e.g., secondary content such as advertisements) for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1b) via a variety of interposed network components.

Content (e.g., audio, video, data, files, etc.) is provided in each downstream (in-band) channel associated with the relevant service group. To communicate with the headend or intermediary node (e.g., hub server), the client devices/CPE 106 may use the out-of-band (OOB) or DOCSIS channels and associated protocols, although the present disclosure is in no way limited to these approaches.

Figure 1C:
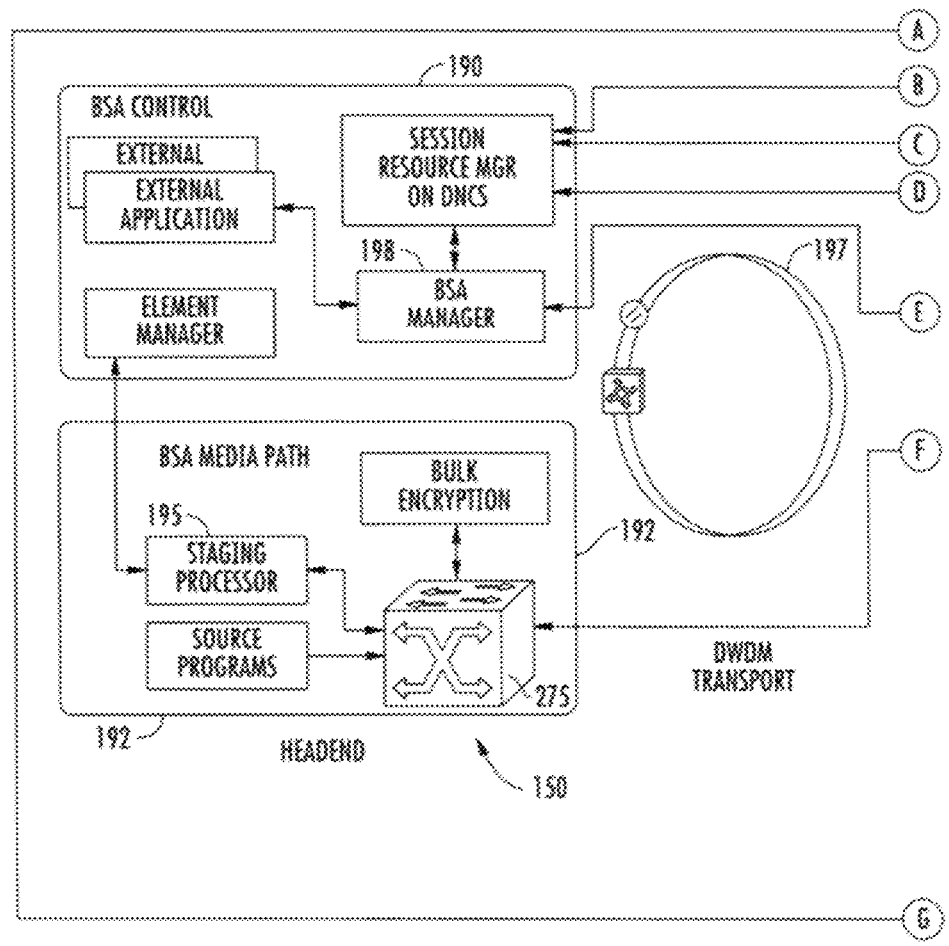
FIG. 1c is a functional block diagram illustrating one exemplary broadcast switched or switched digital video (SDV) network architecture useful with the present disclosure.
Figure 1C:
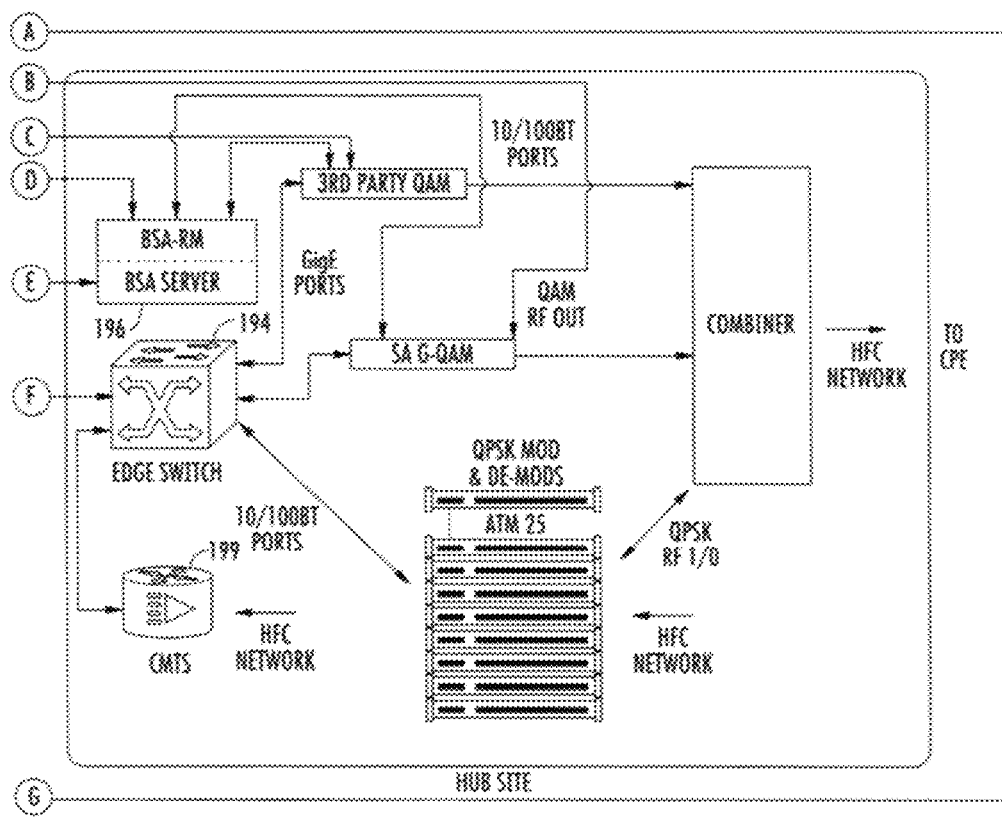

FIG. 1c illustrates an exemplary "switched" network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA, also referred to as "Switched Digital Video" or SDV) media path 192 may include a staging processor 195, source programs, and bulk encryption in communication with a switch 275. A BSA/SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user client devices (including IP-based STBs or IP-enabled consumer devices) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's client device or other IP-enabled device via the user's cable modem. Delivery in such packetized modes may be unicast, multicast, or broadcast.

Referring again to FIG. 1c, the IP packets associated with Internet services are received by the edge switch 194, and in one embodiment forwarded to the cable modem termination system (CMTS) 199. The CMTS examines the packets, and forwards packets intended for the local network to the edge switch 194. Other packets are discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

Figure 5:
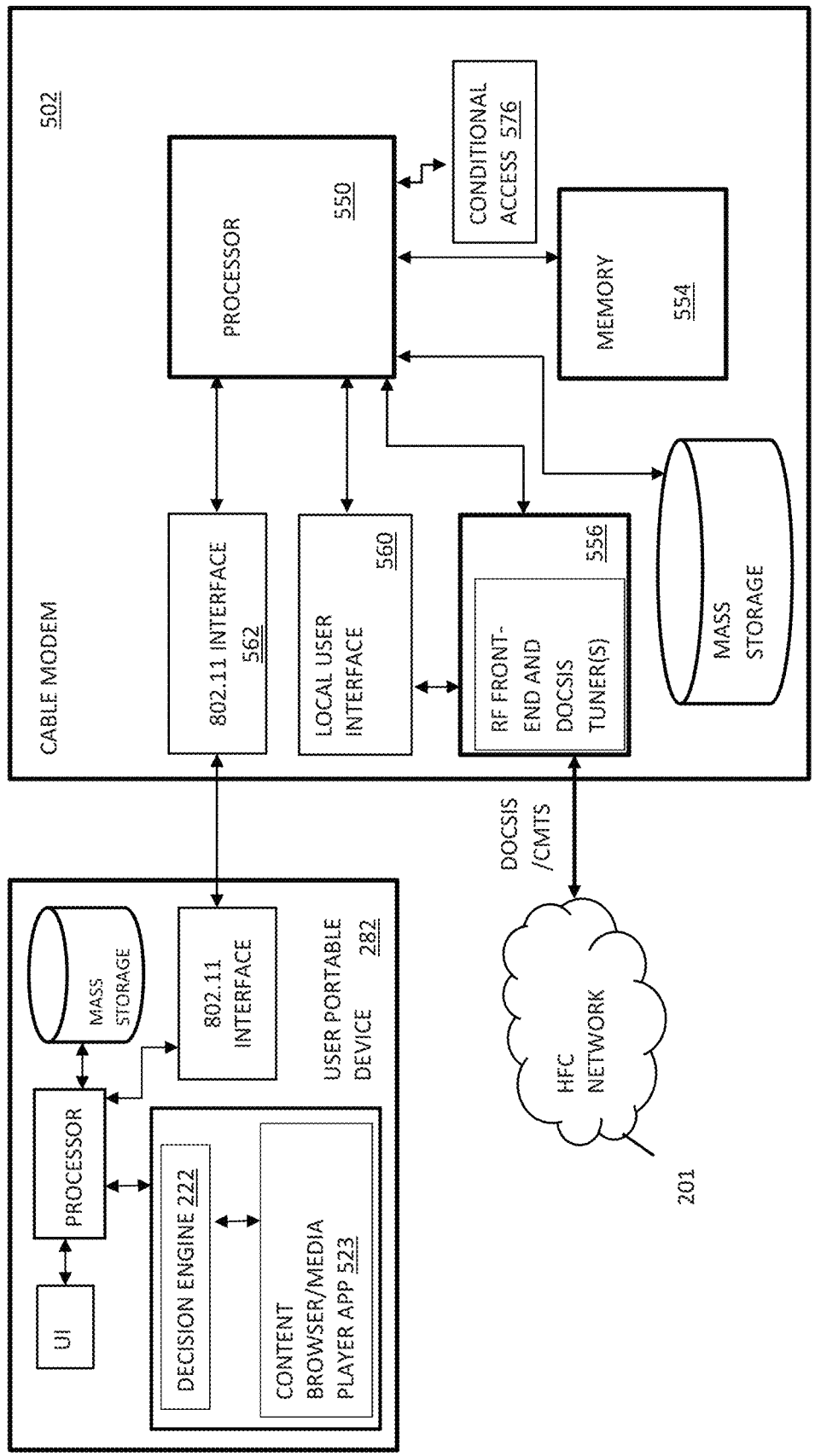
FIG. 5 is a functional block diagram illustrating another exemplary embodiment of client receiver device for use with the secondary content selection and insertion architecture of FIG. 2, wherein a client mobile device communicates with a DOCSIS-enabled cable modem (CM).

The edge switch 194 forwards the packets received from the CMTS 199 to the QAM modulator, which transmits the packets on one or more physical (QAM-modulated RF) channels to the CPE/client devices. The IP packets are typically transmitted on RF channels (e.g., DOCSIS QAMs) that are different that the RF channels used for the broadcast video and audio programming, although this is not a requirement. The client devices/CPE 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.); see the discussion of FIG. 5 presented infra.

Figure 1D:
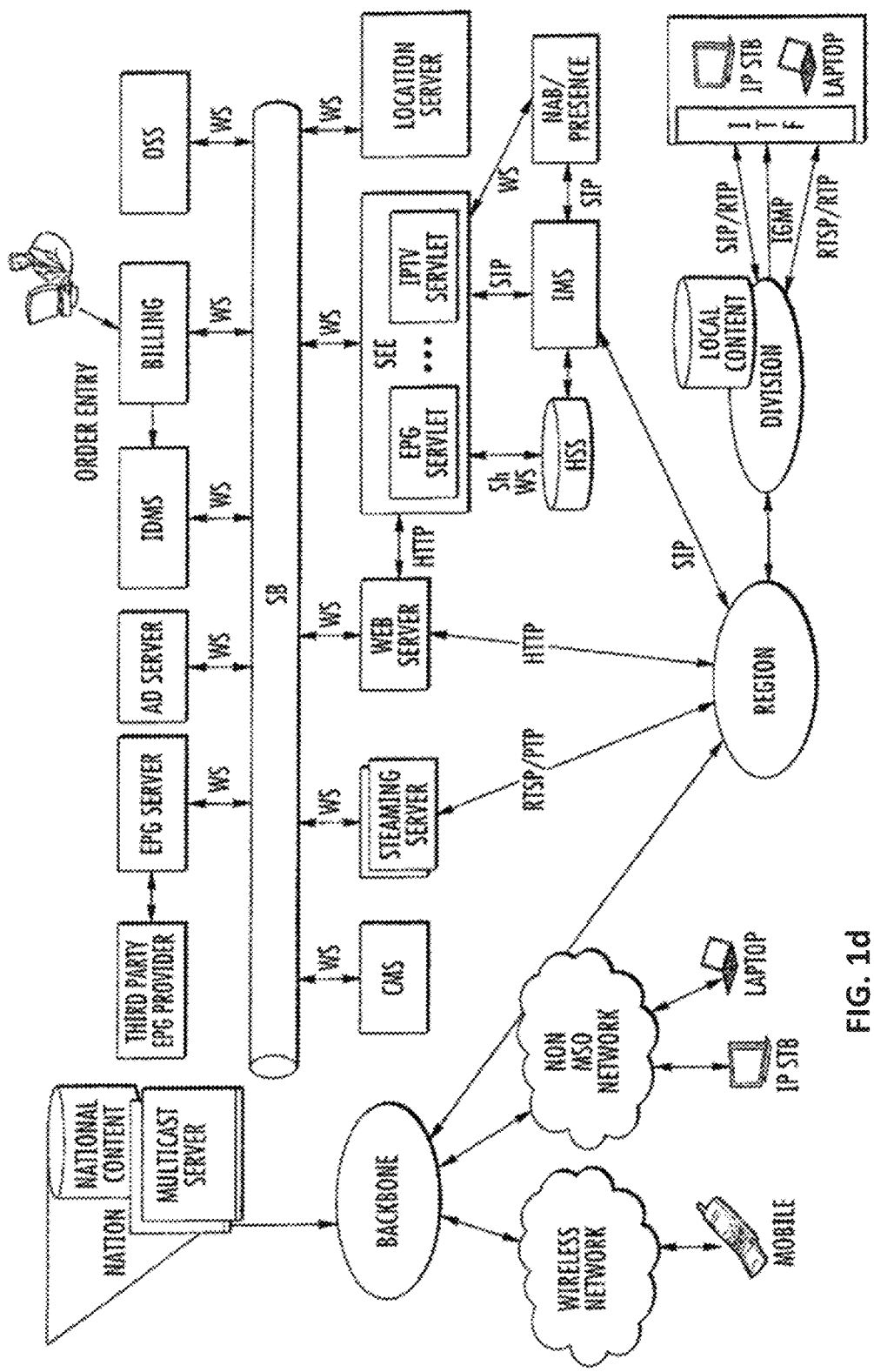
FIG. 1d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, and issued as U.S. Pat. No. 10,264,029 on Apr. 16, 2019, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Secondary Content Selection and Insertion Architecture—

Figure 2:
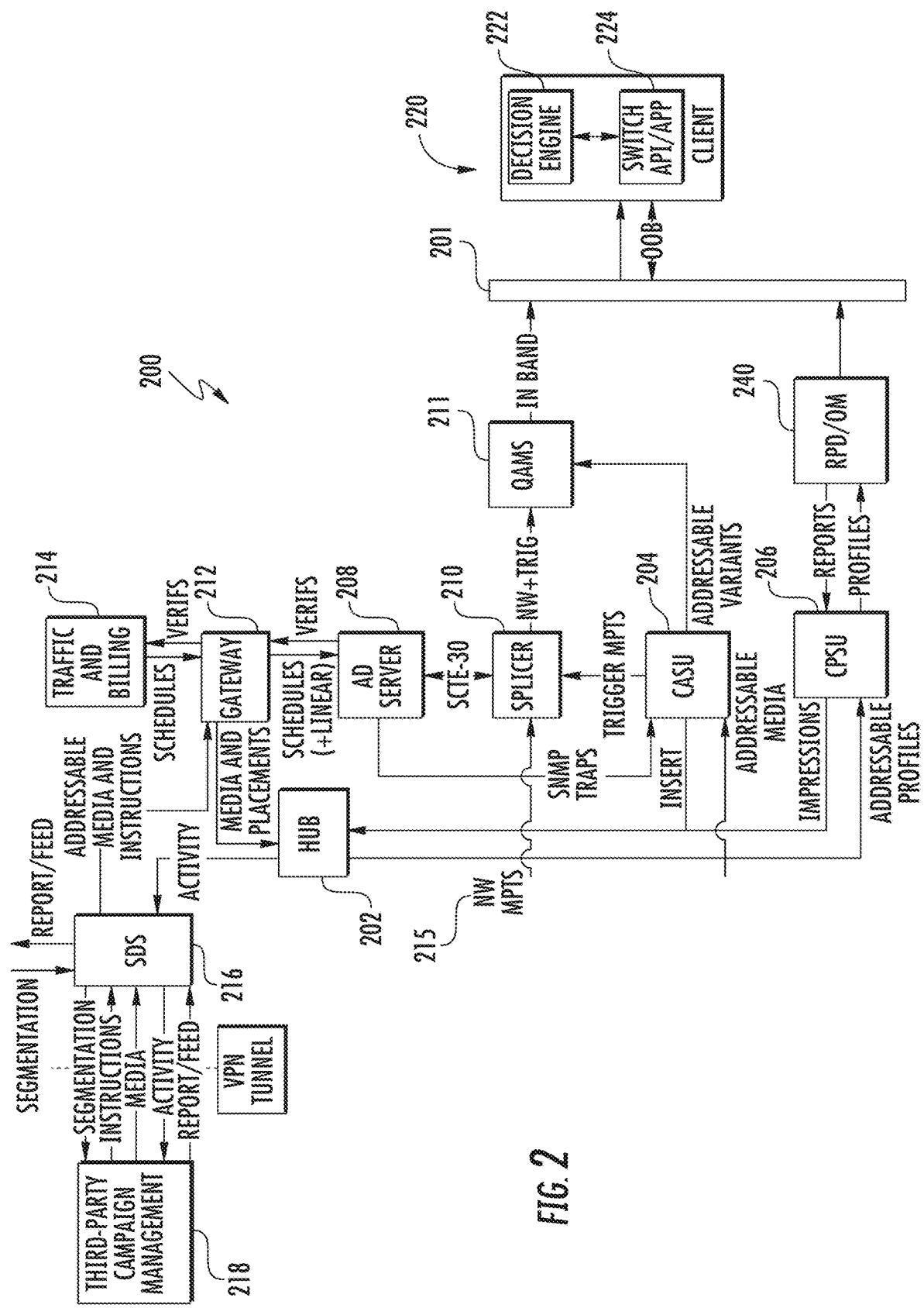
FIG. 2 is a functional block diagram illustrating one exemplary embodiment of a secondary content selection and insertion architecture according to the present disclosure, in the context of a managed content distribution network.

Referring now to FIG. 2, one embodiment of a network-based secondary content selection and insertion architecture according to the present disclosure is described. As shown, the architecture 200 includes a number of different components, including a CASU (Client Advertising Server Unit) 204, which generally manages signaling to the DSTBs 220 and streams addressable advertising copy; a CPSU (Client Profile Server Unit) 206 which manages OOB interactions with the DSTBs, including audience "segmentation" profiles (downstream) and impression management and reporting (upstream); an SDS (Secure Data Server) 216 which hashes client device identifying information (e.g., DSTB or CM MAC addresses) and household identifiers for use by an advertising campaign management "cloud" entity (described in greater detail below); a Gateway Server (GS) 212, which manages linear content schedules and verification files; a Media Hub Server 202, which functions as a "store and forward" server for addressable advertisement copy and instructions, and a Decision Engine (DE) 222 disposed on each of the relevant or participating client devices 220, which inter alia, manages switching to/from addressable advertising copy, and produces impression reporting.

Also shown in FIG. 2 are a traffic and billing server 214, an advertising server 208 (responsible for signaling and managing insertion events in accordance with scheduling information received from the GS 212, including generation of SCTE-30 insertion messages sent to/from the MPEG splicer 210 via e.g., the UDP (user datagram protocol; RFC 768), the latter which receives MPEG-encoded content streams (e.g., programming or other "primary" content) from one or more content sources via the multi-program transport stream (MPTS). A QAM modulator bank 211 modulates the program streams (including inserted secondary content provided by the CASU 204, also according to the UDP in the exemplary embodiment) onto the downstream RF channels using QAM (quadrature amplitude modulation) for transmission over the interposed HFC distribution network 201 to the various client devices 220.

In one implementation, one or more "advertising feeder programs" are designated within the SDV system. In one embodiment, these feeder programs are configured as Source ID's, which are recognized by the switched digital (SDV) delivery system as a source video feed where the secondary content (e.g., advertisements) will be placed when required, based on the triggering mechanism(s) described elsewhere herein. In one implementation, the "targeted" secondary content is placed in the "open" switched digital bandwidth pool, and do not "hard allocate" particular RF frequencies to the secondary content. This approach is used, inter alia, so as to utilize or share the physical (QAM) resources with the switched digital system, such sharing which promotes more efficient utilization of resources as a whole within the network. Notwithstanding, it is appreciated that such hard-allocation (e.g., of one or more particular frequencies or QAMs), such as to only carry secondary content, may be utilized consistent with the present disclosure if desired, whether alone or in conjunction with the "open pool" approach previously described, such as where a limited number of the available QAMs are hard-allocated, while the great preponderance are left "open."

The relevant DE 222 of the DSTB 220 is configured to request a specific advertising feeder program every time it wants to switch to an addressable advertisement, thereby acting as a priori "designated point of entry" for each individual DSTB or customer account (or other unique identifier, including particular individuals associated with a particular account when their identity as being a viewer can be ascertained). Logic within the SDV system conducts necessary mapping to a given service group (SG), edge QAM frequency, etc. to effect delivery of the designated secondary content to that particular DSTB 220. Advantageously, the foregoing approach both (i) requires (smaller) modifications to the CASU 204, DE 222, and SDV client API 224, and (ii) reduces the total required bandwidth (even with an assumed 2% collision rate), depending on service group sizes. Specifically, the foregoing approach bypasses the need to continuously reserve bandwidth resources for secondary content when such resources can be used elsewhere for primary video delivery; rather, they can merely be switched-in or switched-out dynamically without such reservation process and its associated complexity.

It is also recognized that SDV advertisements within a service group (SG) of the network are not continuous. By adding linear advertisements, which only play a comparatively short time (e.g., on the order of seconds or a minute), QAM resources within the service group can be more efficiently utilized.

In the exemplary embodiment, the amount of bandwidth needed for secondary content delivery depends on the combination of: (i) the total addressable linear channels; (ii) the amount of overlap in the existing secondary content schedules between content networks (aka "collision rate"); and (iii) the percentage of the secondary content schedule that will be made addressable (for example, a higher percentage of the schedule made addressable requires more bandwidth than having a lower percentage of the schedule be addressable). In one implementation, this relationship can generally be represented by Eqn: (1):

$$BW_r = (BW_{bi} \times n_{abi} \times n_{azi} \times n_{avi}) + (BW_{bj} \times n_{abj} \times n_{azj} \times n_{avj}) \qquad \text{Eqn. (1)}$$

wherein:
$BW_r$=Total Bandwidth required for addressable advertisement schedule
$BW_{bi,j}$=Baseline (e.g., Standard Definition or HD) bandwidth required for advertisement
$n_{abi,j}$=Number of simultaneously occurring advertisement breaks
$n_{azi,j}$=Number of advertising zones
$n_{avi,j}$=Number of addressable advertisement variants So, as an illustration of the foregoing, two (2) advertisements run in a given break with three (3) variants each and supporting HD & SD placements in 6 advertising zones would require 2×3×6=36× baseline (SD) advertising bandwidth+36×HD advertising bandwidth, or 36+(4×36)=180× SD bandwidth (assuming HD=4×SD BW). Hence, under a reservation-based scheme, appreciable amounts of bandwidth would need to be reserved to accommodate the foregoing schedule, whereas in the SDV implementation, such bandwidth is only accessed/consumed when needed. In the exemplary specific implementation of the architecture 200 of FIG. 2, the Assignee hereof estimates bandwidth requirements at: (i) 68.4 Mbps from the CASU 204 to the QAMs 211 per advertising zone (i.e., 2 SD Channels*2.4 Mbps*3 addressable variants per channel*1 source ID per variant=14.4 Mbps, plus 2 HD Channels*9 Mbps*3 addressable variants per channel*1 source ID per variant=54 Mbps); and (ii) 1 Mbps between all STB client devices 220 and the CPSU 206 (which includes, per STB: segmentation messages (20 bytes), impression messages (100 bytes), status messages (200 bytes), and an ACK message (20 bytes), and therefore a single round trip total of 340 bytes).

A third-party campaign management server 218 is also shown, communicating with the SDS 216 in the exemplary embodiment via a VPN (virtual private network) "tunnel" so as to protect the transmitted (sensitive) data flowing between the MSO and the third-party advertising campaign management service. Hence, in the illustrated embodiment, many of the higher-level or strategic campaign management functions are allocated to a non-MSO entity, while the "tactical" insertion of particular secondary content within program streams delivered to particular receiver devices/households is handled by the MSO infrastructure. So, for example, and advertiser (e.g., car maker) who wants to maximize their penetration into the subset of MSO subscribers who might have interest in their cars could simply communicate such desire to the third-party campaign manager, who then structures a campaign for delivery to "targeted" MSO subcribers (e.g., those who have previously purchased or leased a car from the car maker, have expressed interest in their cars, etc.) as determined by the receiver/household profile (described in greater detail below).

As shown, the architecture 200 of FIG. 2 also includes a modulation/demodulation apparatus, such as e.g., an RPD/OM (return path demodulator/out-of-band modulator) infrastructure 240 used for OOB communication with the various DSTBs 220 (and their DE processes 222) to, inter alia, support SDV channel-change operations. The CPSU 206 in the illustrated embodiment both passes generated profile data/recommendations to the DE via the demodulator/modulator apparatus 240, and receives reporting data (e.g., impression reports, discussed in greater detail below) from the DE 222 via the apparatus 240.

Additionally, on the client device side, the DSTB 220 further includes a switch engine or API (application programming interface) 224 with which the DE conducts interprocess communication so as to effect content delivery "switches" (i.e., per the SDV infrastructure of the MSO network, as shown in FIG. 1c). See the discussion of FIG. 4a below for additional detail on this API.

The foregoing components are in one embodiment each in data communication with one another via a LAN/WAN/MAN 160 (see FIG. 3), thereby enabling each of the components to be disposed at disparate locations if desired or required. For instance, in one exemplary implementation, a substantially centralized approach is used, wherein all the CASU servers 204 within the MSO's network are located at one or more master or "super" headends (MHE/SHEs), whereas the SDS 216, hub 202, and CPSU 206 are located at one or more respective regional data centers (RDCs).

Alternatively, in a localized (decentralized) approach, all the CASU servers 204 for the MSO are located in the respective (local) headend. Each CASU server 204 is accordingly configured for one advertising zone. In addition, the SDS 216, hub 202, and CPSU 206 are also located within the same (respective) headend. Various permutations of the foregoing are also envisaged by the present disclosure.

Moreover, while the architecture 200 of FIG. 2 illustrates basically an MSO-based system, one or more of the foregoing components may be third-party owned or operated.

Figure 2A:
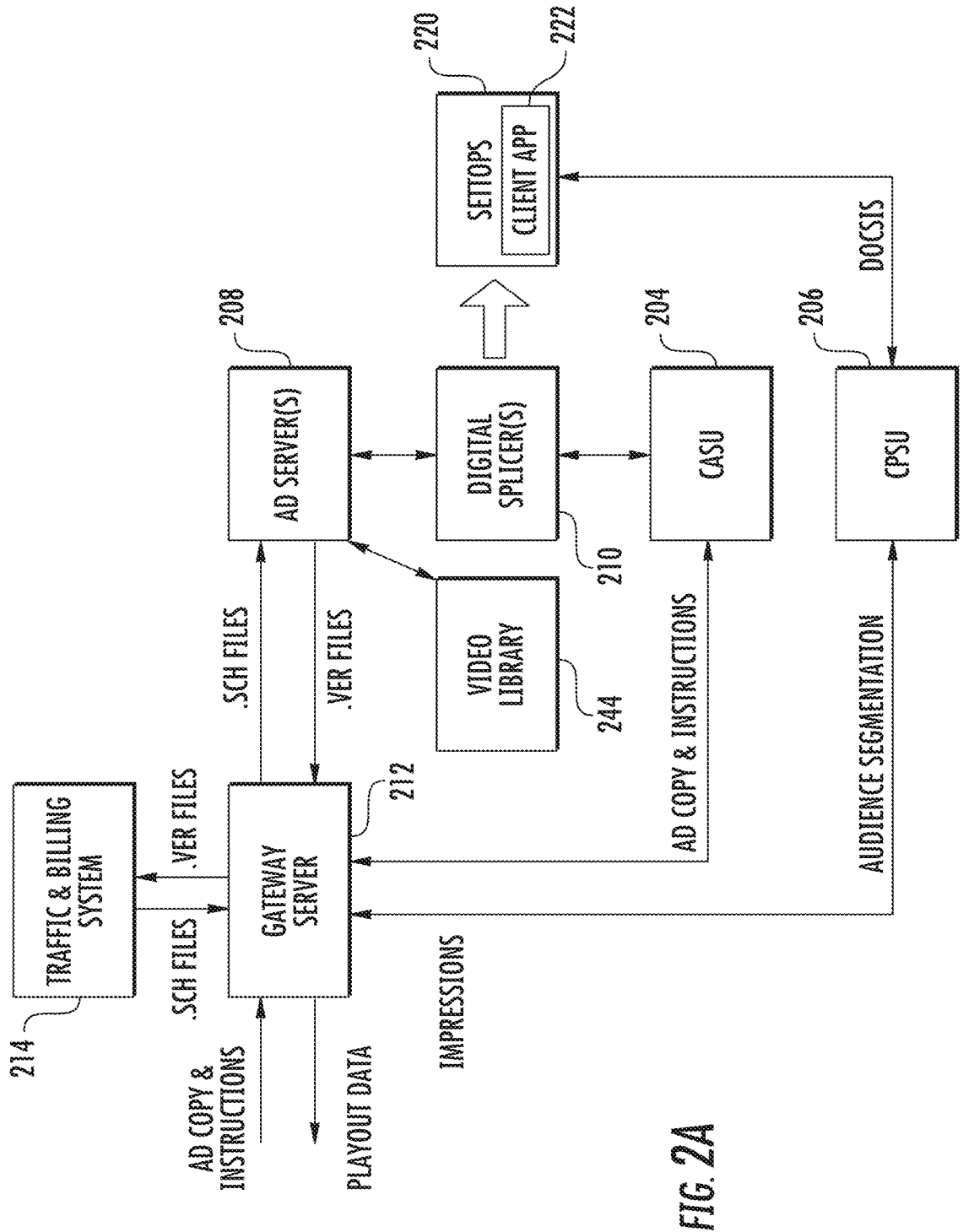
FIG. 2a is a logical block diagram illustrating exemplary data flow within a first embodiment of an addressable secondary content selection and insertion architecture according to the present disclosure.

Referring now to FIG. 2a, a logical block diagram illustrating exemplary data flow within a first embodiment of an addressable secondary content selection and insertion architecture according to the present disclosure is shown. In this embodiment, the architecture 200 of FIG. 2 is utilized.

As shown, the various entities of the architecture 200 transfer various types of data structures (e.g., .ser and .ver files, encoded video advertising content, and other data files) between themselves to effect the functions of (i) secondary content selection, and (ii) secondary content insertion within extant program streams delivered to particular receiver devices 220.

The architecture of FIG. 2a makes use of one or more indigenous MSO advertising servers 208 to provide e.g., SCTE-130 communications with the MPEG digital splicer 210. A video library 244 is also provided, which communicates with the advertising server 208. In one exemplary implementation, the video library 233 comprises a commodity storage component (or set of components) that is used to store "pre-processed" secondary content to be used by the addressable system through delivery to the advertising server (see FIG. 2b).

Figure 2B:
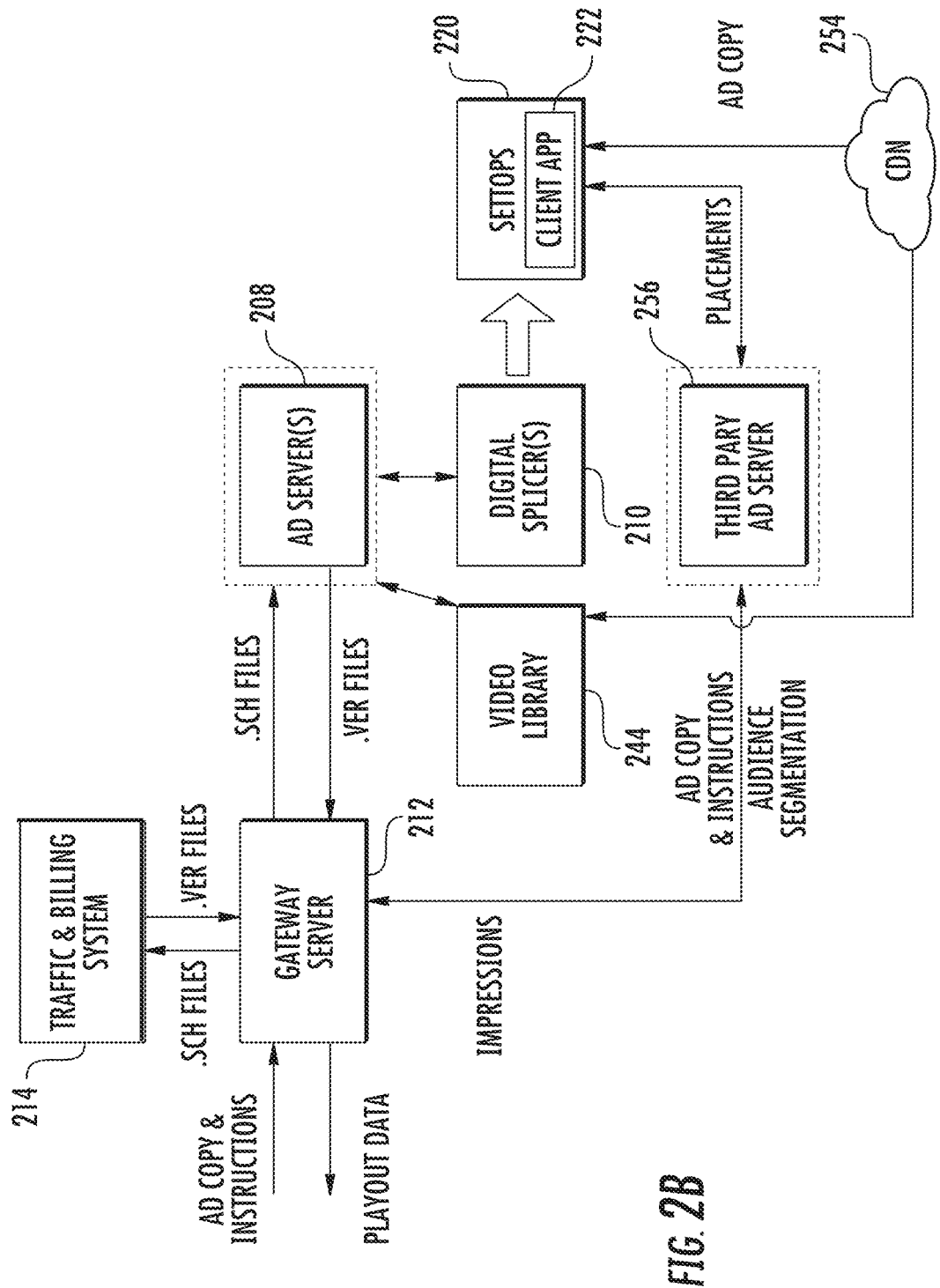
FIG. 2b is a logical block diagram illustrating exemplary data flow within a second embodiment of an addressable secondary content selection and insertion architecture, enabling inter alia, secondary content delivery via a separate "cloud" entity or content delivery network (CDN).

FIG. 2b is a logical block diagram illustrating exemplary data flow within a second embodiment of an addressable secondary content selection and insertion architecture, enabling inter alia, secondary content delivery via a separate "cloud" entity or content delivery network (CDN). In contrast to the architecture of FIG. 2a, the logical flows and components within FIG. 2b rely on a third-party advertising server 256 which is outside of the MSO network infrastructure (which as shown by the dotted lines in FIG. 2b, may be logically and/or physically integrated with the MSO advertising server 208). As shown, the server 256 communicates with the GS 212 to receive advertising "copy" or media and instructions, as well as audience segmentation data, and provide impression data garnered from the various client devices 220, yet also communicates with an external CDN (e.g., managed internetwork or other non-MSO infrastructure) for delivery of the advertising copy to the client devices, as well as delivery of content to the video library 244.

In one exemplary scenario, the extant content channels (and the SCTE 35 or other cues present therein) are replaced by a customized linear addressable cue (described in greater detail below); however, instead of having the advertisements be present on the local video library 244, a third-party advertisement agency or content provider is used to dynamically supply advertising content via the CDN 254 for placement into the linear feed, such dynamic supply being based on e.g., various predetermined business rules.

In one implementation, the incoming programming content (e.g., from a content network or source) includes inserted SCTE-35 cues; these cues are removed and replaced with a customized linear addressable counterpart cue structured specifically to useable by the client application on linear-addressable enabled devices (e.g., DSTBs) of network subscribers, such as the client 220 of FIG. 2. The replacement cue is structured consistent with the requirements of SCTE-35; however, particular values are inserted into one or more fields of the replacement cue to identify it to the client application components 222, 224 as being a linear addressable cue (and hence invoking the client to implement the previously provided profile logic to, for example, cause the client device 220 to switch to the designated advertising content via the SDV system.

In the exemplary implementation, the DPI (digital program insertion) packet identifier or PID is sourced from the CASU 204 (FIG. 2), and is indicative of the relevant advertisement schedules and spot information, which is managed by an MSO-based or third-party service or process. The relevant PID(s) is/are added via an advertising processing and insertion device within the network (e.g., a CAP-1000 manufactured by Arris Corporation).Specifically, in this embodiment, a plurality of data bits are inserted in the splice information section of the DPI PIDs (see, inter alia, Section 6.5 of SCTE Standard SCTE 35 2016, incorporated herein by reference in its entirety and FIG. 2c herein, showing parameters of the splice_info_section according to SCTE 35 2016.), that are set according to the SCTE-35 section syntax for MPEG "short forms" or "short sections". Particularly, the splice_info_section is encoded as a one byte table_id (set to xFC) followed by the one bit section_syntax_indicator (0) and one bit private_indicator (0); see FIG. 2c. The two bits that are "reserved" in the splice_info_section are set to 1 in accordance with the specification, followed by the 12 bit section length parameter and the message data (along with any relevant national advertisement information).

The "linear addressable" encoded SCTE-35 cue is then mixed into the transport stream (TS) stream via the splicer 210 (with a different PID; e.g., hexadecimal 0x86), so that the client application/decision engine 222 on the relevant client devices can access the stream designated by that PID (i.e., the targeted advertisement) in advance of the beginning of the advertising spot, so as to render a substantially seamless transition for the client device user.

Non-Linear Variants—

It will also be appreciated that the methods and apparatus described herein can be readily adapted for use with non-linear delivery paradigms such as e.g., VOD (video on demand). In one such variant, non-linear content-related delivery includes inserted breaks or cues similar to the linear content. Although primarily envisaged as "commercial free", such non-linear content can be encoded with breaks for advertisements or other secondary content either by the content source or the MSO, such as for example for use with non-premium or free content streaming by the MSO. For instance, the MSO might upcharge for "commercial free" VoD or Start Over functionality, whereas that with the commercial breaks might be offered at a reduced monthly or one-time rate, or even free or as consideration for some other service provided by the subscriber (e.g., participating in a survey).

In one implementation, the non-linear content (e.g., VOD movie or TV episode) is characterized, whether by the MSO or an upstream content source or processing entity, as to one or more insertion opportunities therein (e.g., is parsed into segments divided by one or more insertion opportunities). In one methodology, one or more of the insertion opportunities associated with the non-linear content (e.g., at onset, such as when VOD session is queueing up the requested content for delivery, at a pre-planned intermediate break within the movie, at the end of the movie, or as part of a telescoping function associated with the movie) are identified, whether before delivery or "on the fly" during delivery, and one or more secondary content elements selected for "insertion" into the non-linear opportunities based on e.g., fitting within a prescribed temporal window, suitability for audience (e.g., no "adult" themes for a prospectively juvenile audience), as well as the CPSU-provided profile data resident on the CPE and used by the DE 222. In the present context, the insertion of the secondary content may use the aforementioned extant SDV infrastructure of the MSO network 101, such the DSTB 220 is accessing one in-band QAM (e.g., a designated VoD QAM) for the delivery of the primary (VoD) content, including trick mode functionality via LSCP, whereas the targeted secondary content is provided via a selected SDV channel which is also accessible to the client device 220. In one such variant, the trick-mode functionality is disabled or suspended during the play of the secondary content, such that the user must effectively sit through the targeted spot to "come out the other side" within the VoD primary content. Moreover, if a user trick-modes across the break boundary (thereby triggering the SCTE-35 message to the advertising server 208 and subsequent operations; see FIG. 6a discussion presented below), the logic is optionally configured in one embodiment to suspend the trick mode functionality and invoke the secondary content switch as previously described, such that the user is precluded from "getting a running start" and avoiding the secondary content. Likewise, if the user backs up over a boundary of the advertisement break, logic within headed can preclude the signaling and insertion by the CASU of the same content if it has already been watched once by the user, as determined by e.g., the impression data sent upstream by the DE 222.

IP-Based Variants—

Figure 2D:
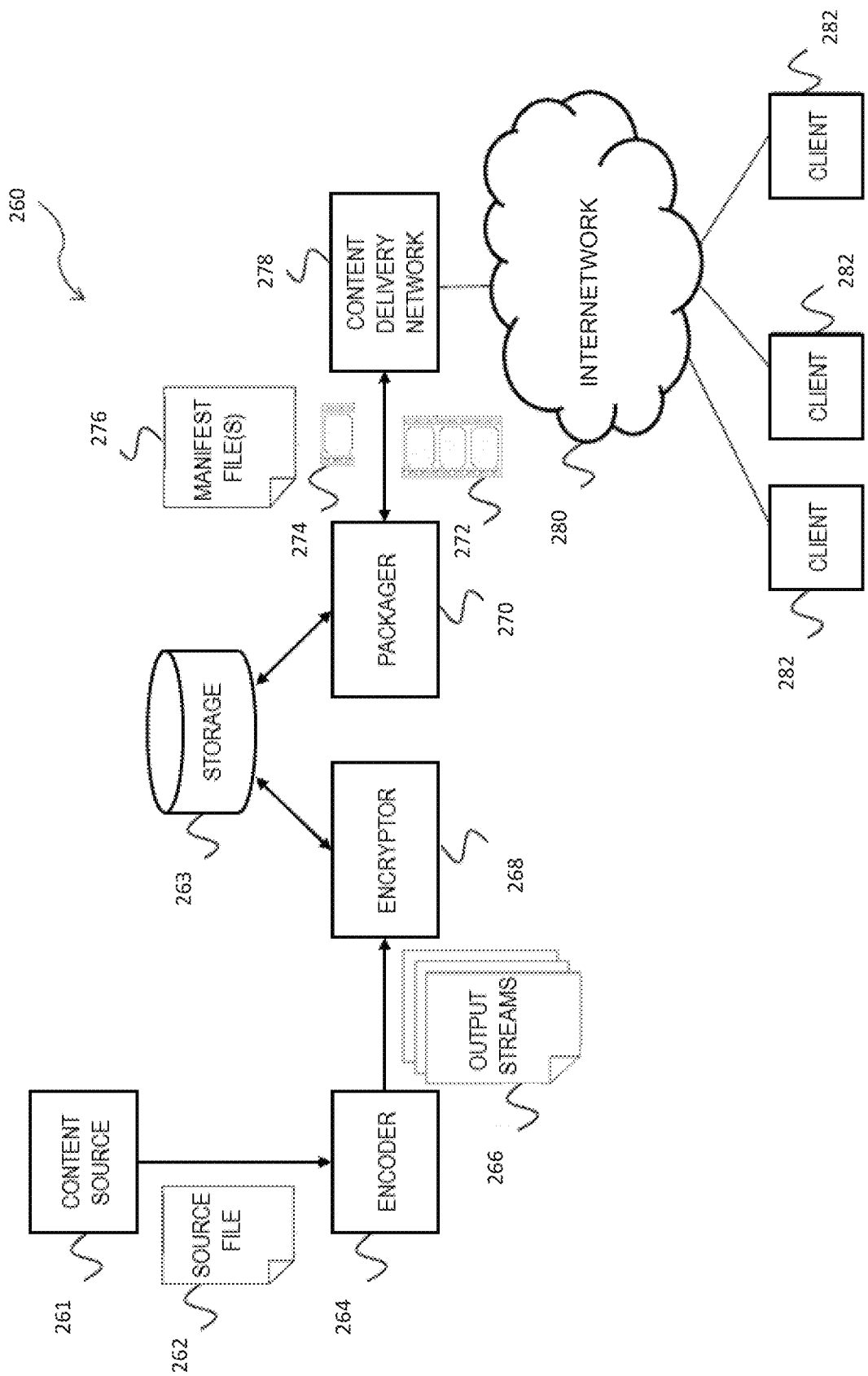
FIG. 2d is a functional block diagram illustrating another exemplary embodiment of a secondary content selection and insertion architecture according to the present disclosure, in the context of deliver of IP-based content streaming to IP-enabled portable or other devices via a CDN.

FIG. 2d discloses another exemplary configuration of an architecture 260 for providing video or other media content to client devices 282 via a content delivery network (CDN) 278, such as that disclosed in U.S. patent application Ser. No. 15/204,610 filed Jul. 7, 2016 entitled "APPARATUS AND METHODS FOR PRESENTATION OF KEY FRAMES IN ENCRYPTED CONTENT", and issued as U.S. Pat. No. 10,652,594 on May 12, 2020, which is incorporated herein by reference in its entirety. As shown in FIG. 2d, the CDN 278 is in communication with client devices 282 via the network 280. In one embodiment of the present disclosure, the network 280 comprises an internetwork, such as e.g., the Internet. While described in the context of an Internet Protocol network, it will be recognized that the principles of the disclosure may be extended to other transport modalities and network paradigms.

The requesting client device 286 may include home gateway devices and/or media client devices. In one embodiment a media client device is a portable device. Common examples of portable devices include, without limitation, tablets, phablets, smart phones, smart televisions (TVs), desktop and laptop personal computers (PC), and portable media players. In another embodiment, the media client device may comprise a file server; file servers are common in both commercial and residential use. For example, a subscriber may have a PC which can play media files, but which also serves his/her other consumer electronics (e.g., smart phone and tablet).

In one embodiment, an encoder 264 encodes a source file 262 from a content source 261 into at least one encoding format (e.g., transcodes a source file from one format to at least one other format). In another variant, the source file 262 is encoded into a plurality of encodings that correspond to a respective plurality of one or more device types, codecs, resolutions, file formats, audio encodings, bit rates, etc. The variety of encodings may be utilized by the CDN 278 (and the packager 270) via adaptive bitrate (ABR) streaming.

"Adaptive bitrate (ABR) streaming" refers to streaming multimedia over computer networks such that a source file thereof is encoded into multiple bitrates. Encoded content segments of varying bit rates are sent to a client device. Non-limiting examples of ABR streaming include, without limitation, MPEG-Dynamic Adaptive Streaming over HTTP (DASH), *Adobe® Dynamic Streaming for flash, Apple® HTTP Adaptive Streaming, Microsoft® Smooth Streaming, QuavStreams® Adaptive Streaming over HTTP, and upLynk®.*

As shown in FIG. 2d, a source file 262 from a content source 261 is input to the encoder 264. Various content sources 261 may provide source files 262 to the encoder 264. For example, content may be received from a local, regional, or network content library. Alternatively, content may be received from linear analog or digital feeds, as well as third party content sources. Internet content sources (such as e.g., a web server) may also provide Internet content to the encoder 264. In yet another embodiment, content may be received from subscriber and/or non-subscriber devices (e.g., a PC or smartphone-originated user made video).

An output stream 266 comprises key frames (e.g., I-frames) at a certain temporal distance (e.g., 2 seconds or 10 seconds) apart. A key frame is a fully specified picture like a conventional static image file. Key frames may be placed in any number of temporal distances, from 0 (i.e., every frame is a key frame) to a single key frame followed by all delta frames, per stream.

Parameters used by the encoder 264 to encode the source file 262 include: (i) whether the output streams should be encoded into separate video and audio only tracks, or video tracks with audio included, (ii) an appropriate key frame period, (iii) a frame rate, (iv) segmentation duration, (v) video resolutions, (vi) video bitrate, (vii) audio bit rate (where necessary), (viii) audio sample rate, (ix) a number of audio channels, (x) aspect ratio, (xi) video codec, (xii) specific device profiles, (xiii) audio volume, (xiv) file type and extension, and (xv) standard specific encoding profiles. Standard specific encoding profiles include e.g., H.264, which includes different standard encoding profiles for baseline, main, and high encoding. Additionally, the encoder 264 may utilize information used for cutting out other resolutions/aspect ratios from a higher resolution/different aspect ratio file. For example, the encoder 264 may center-punch a standard definition (SD) image or video from a high definition (HD) source. Similarly, an HD image or video may be center punched from a 4K, 8K, 16K source.

While output streams 266 are shown as separate files (for example MPEG 4 transport stream (.ts) files), in a further embodiment of the present disclosure, all of the streams (i.e., streams 266) are presented in a single "super" file. Having a single comprehensive file comprising multiple streams will lower the number of files the CDN 278 must manage.

The encoder 264 may encode output streams 266 with audio tracks (e.g., AC3 audio). Different encoding formats and bit rates may be selected based on the requirements of the stream, end user equipment, and the protocols and formats used by the CDN 278.

The encoded output streams 266 may be encrypted by an encryptor 268 via an encryption algorithm (e.g., AES, DES, public key encryption, etc.). The encoded and encrypted output streams are stored in a storage device 263. In one embodiment, the functionality of both the encoder 264 and the encryptor 268 may be integrated into a single apparatus The stored output streams are utilized by a packager 270 to provide a manifest (or index/playlist) file 276 and video segments 272 to a requesting client device 282. Specifically, the manifest file 276 is a data structure comprising a listing of addresses for each of the video segments 272 of a stream of data, and includes information about the video segments 272 such as bitrates, closed captioning, audio, etc. Different ABR models may use different manifest files 276.

In one implementation, the list of media segment entries in the manifest file 276 comprises a list of network addresses (which may be remote or local) where the corresponding segments 272 of media content, including the targeted secondary content and key frames 274, may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment 272 in a file structure 276) or relative (i.e., the path provides a relative location of the segment 272 in a file structure 276).

The service provider may be a conglomeration of multiple logical entities. Multiple logical entities may be useful to further distribute services over various network resources or enable additional features provided by partnered corporations or providers. Multiple logical entities, for example, may provide local content for a particular service group or geographic area. Furthermore, having content providing entities closer to end users may offer lower latency and may add network redundancy. Common examples of network resources include e.g., broadcast, multicast, video-on-demand, advertisement services, local services, etc. In one specific example, the media segment listing may include a listing of URL links which is further punctuated with HTML tags or Javascript, which is configured to enable targeted advertisement insertion. For instance, the video client of the client device 282 (e.g., DE "app"; not shown) may insert tailored locally or remotely stored advertisement for commercial breaks, such as under the direction of the CPSU 206 of FIG. 2 (i.e., via profile data and related targeting info sent to the DE of the client 282 via e.g., an inter-process messaging format or other communication).

In the exemplary embodiment, each media segment 272 is an encoded and encrypted subsection or segment of media content. The media segments 272, when decrypted, decoded, and played in the appropriate order, render the original media content. In one implementation, each media segment 272 represents a portion of video associated with a specific resolution, codec, and time stamp. The media segments are assembled according to a time stamp sequence.

Access control such as Digital Rights Management (DRM), conditional access (CA), trusted domain (TD), etc. may be implemented by the packager 204 (or alternatively the CDN 206). One example of utilization of the foregoing technologies is described within co-owned U.S. patent application Ser. No. 13/710,308 filed on Dec. 10, 2012 entitled "APPARATUS AND METHODS FOR CONTENT TRANSFER PROTECTION", and issued as U.S. Pat. No. 9,565,472 on Feb. 7, 2017, which is incorporated herein by reference in its entirety. As discussed therein content is delivered via a managed content distribution network (such as a cable or satellite or HFCu network having an MSO), and the MSO manages the rights and restrictions of the content outside of a premises, and in a data center or headend, by providing requested content to a gateway device within the premises of a user.

In another embodiment, the methods and apparatus disclosed in U.S. Pat. No. 8,701,138 issued Apr. 15, 2014 and entitled "ZONE CONTROL METHODS AND APPARATUS", which is incorporated herein by reference in its entirety, may be used consistent with the present disclosure. Specifically, the aforementioned patent discloses, inter alia, methods and apparatus for selectively providing targeted secondary content to a user based at least in part on a logical, geographic, or other "zone" or space associated with the user. In one embodiment, when the user requests primary content at a non-legacy device (e.g., an IP-capable device such as an IP-enabled DSTB, portable computer, or 4G smartphone), the secondary content that is provided therewith is the same secondary content which would have been provided to the user had the request been generated at a legacy device; i.e., the "zone" (whether geographic, demographic, psychographic, or otherwise) is preserved. In one implementation, a non-legacy device is associated with a user's zone by introducing a link between a server providing content to the device (e.g., a web server) and a server which has the ability to determine an appropriate zone for the user. This is accomplished for example by associating each user with an advertisement zone identifier. Alternatively, the foregoing may be accomplished by associating each user with a device that is associated with a physical hub or node identifier, which, in turn, is associated with an advertisement zone identifier. In yet another variant, a service group identifier (rather than advertisement zone identifier) may be used.

Hence, using such methods and apparatus, the "reach" of a given advertising schedule (and its associated particular spots) generated using the methodology herein that is based on data derived from legacy CPE can be preserved for non-legacy, mobile devices.

Server Apparatus—

Figure 3:
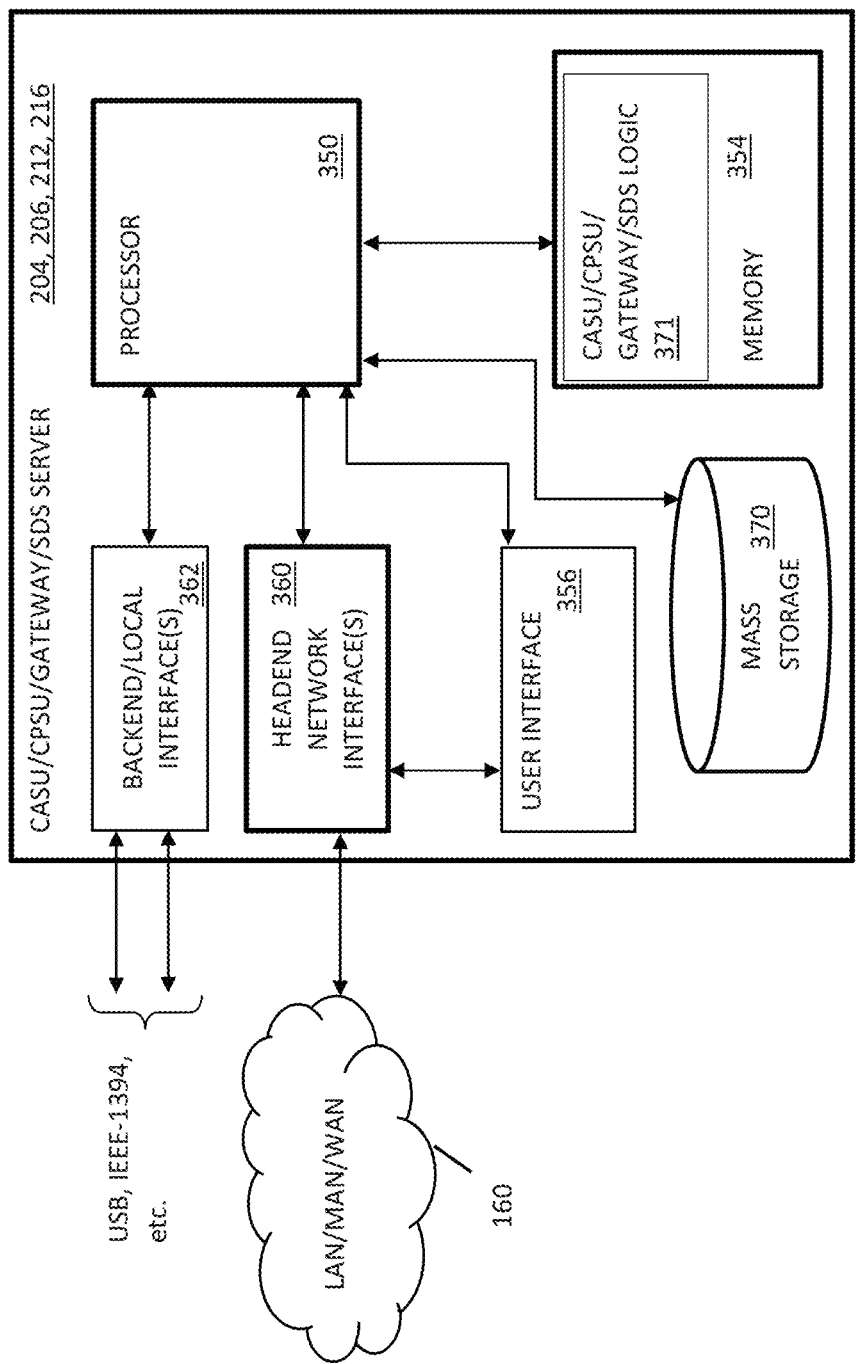
FIG. 3 is a functional block diagram illustrating one exemplary embodiment of a secondary content server apparatus (e.g., CASU, CPSU, Gateway server, or SDS) for use with the secondary content selection and insertion architecture of FIG. 2.

FIG. 3 illustrates one exemplary embodiment of a secondary content management server hardware architecture useful with, inter alia, the architecture 200 of FIG. 2, such as for the CASU server 204, CPSU server 206, GS 212, or SDS 216. As shown, the server apparatus generally comprises one or more network interfaces 360 for interfacing with other entities of the content delivery network 101 and/or the managed network headend 150 (including the LAN/MAN/WAN 160 of FIG. 1 as illustrated), a processor 350, a memory apparatus 354, mass storage 370 (e.g., RAID array, solid state drive (SSD), HDD, and/or NAND/NOR flash memory), and a plurality of backend or local interfaces 362 such as e.g., USB, IEEE-1394 (FireWire), Thunderbolt, IEEE Std. 802.11 (Wi-Fi), etc.

The server apparatus of FIG. 3 also includes a user or operator interface 356, which is useful for input of data, determining device status, diagnosing communication issues, generating reports, etc. In one embodiment, the user interface is implemented in a windowed software environment of the type well known in the computer arts, although other approaches may be used. Moreover, it is appreciated that the user interface 356 may also include a remote interface (such as via a web-based client application) for the operator or even a third party customer.

In the illustrated embodiment, the CASU/CPSU/SDS/GS logical processes 371 described above with respect to FIGS. 2-2b are implemented as computerized logic rendered as code and operative to run on the respective server. The logical processes 371 are also implemented according to the aforementioned centralized or decentralized architectures, and may also be physically and/or logically integrated with other components of the MSO network or third parties. For instance, the CASU/CPSU/SDS/GS functionality may be hosted on another extant platform, such as via additional software/firmware running on a separate server blade or partition of the host device.

In the illustrated implementation, the CASU/CPSU/SDS/GS server functionality is based on an a "distributed' architecture wherein each component implements its own persistence database, in lieu of a centralized data store, although it will be appreciated that other configurations may be used consistent with the present disclosure. This decentralized approach advantageously provided enhanced/simpler failover and redundancy features, and also may reduce access latency when compared with a more centralized approach. In one particular implementation, the component storage is placed within a virtual SAN (storage area network) to "future-simplify" failover and redundancy. If any one of these components becomes unavailable, a replacement server can easily be brought online to replace it, thereby mitigating the effects of such failure.

Client Device—

Figure 4:
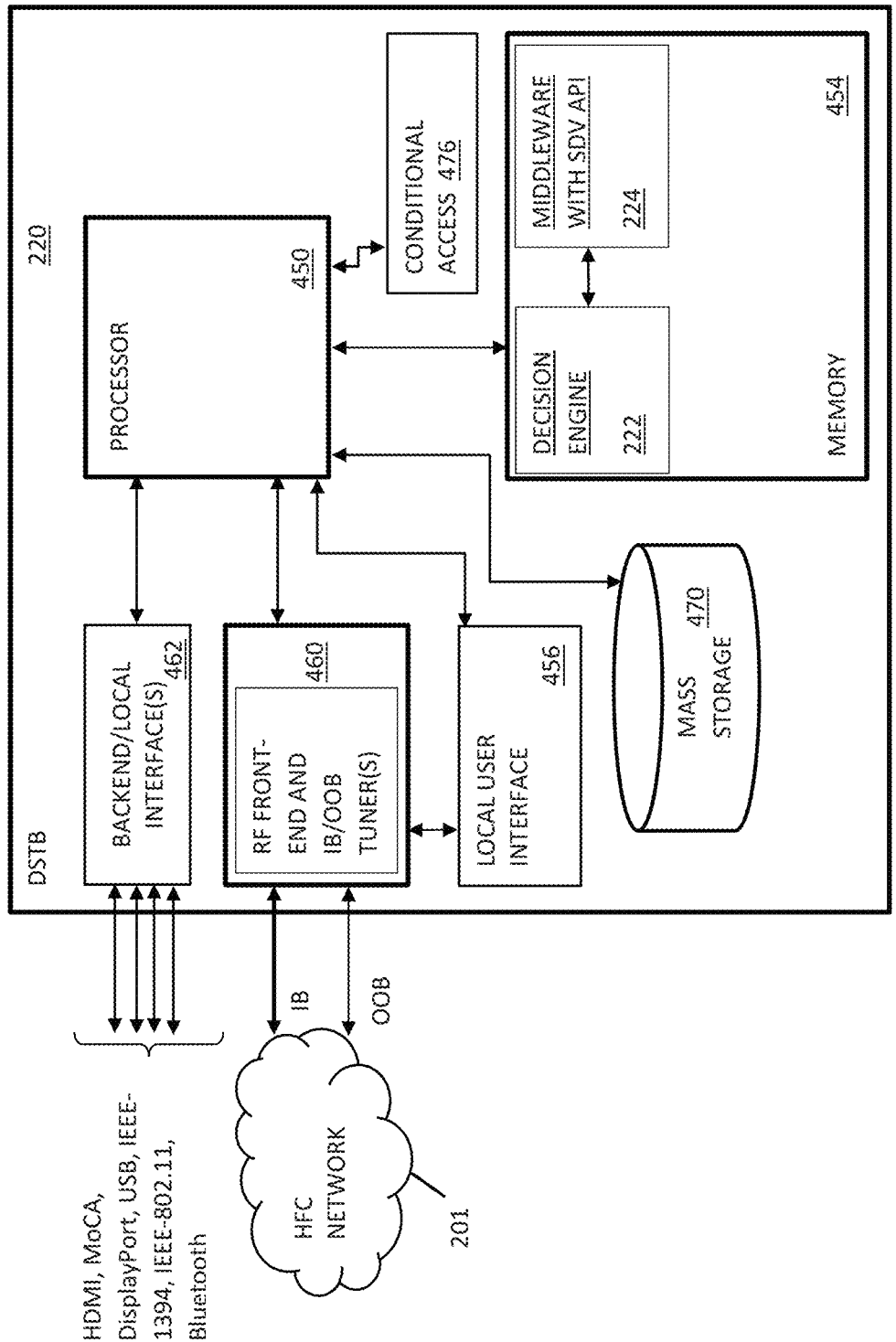
FIG. 4 is a functional block diagram illustrating one exemplary embodiment of client receiver device (DSTB) for use with the secondary content selection and insertion architecture of FIG. 2.

FIG. 4 illustrates one exemplary embodiment of client device hardware architecture useful with, inter alia, the architecture 200 of FIG. 2, such as for the DSTB 220. As shown, the client device 220 generally comprises one or more front-end RF network interfaces 460 including tuner(s) for in-band and OOB communications with other entities of the content delivery network 101 and/or the managed network headend 150, a processor 450, a memory apparatus 454, mass storage 470 (e.g., solid state drive (SSD), HDD, and/or NAND/NOR flash memory), and a plurality of backend or local interfaces 462 such as e.g., HDMI, DisplayPort, USB, IEEE-1394 (FireWire), Thunderbolt, IEEE Std. 802.11 (Wi-Fi), Bluetooth, etc. for communication with local display or rendering devices, control devices, wireless infrastructure, etc. A conditional access (CA) module 576 may also be included.

The client device 220 of FIG. 4 also includes a user "local" interface 456, such as for front panel device control and illumination, receipt of local user inputs, etc.

In the illustrated embodiment, the DE logical process 222 and the SDV "switch engine" (with API) 224 described above with respect to FIGS. 2-2b are implemented as computerized logic rendered as code and operative to run on the respective client 220. In one embodiment, the DE client 222 comprises a software application ("app") that is downloaded onto the client device 220 either at time of install or subsequently thereafter, such as via an "app store" or similar functionality, or by insertion of media such as CD-ROM or USB flash drive. The MSO or a proxy thereof may also install the DE app 222 on the DSTB via e.g., OOB download of an executable, and subsequent remote execution thereof via the processor apparatus 450.

Also resident on the client device 220 is middleware configured to execute one or more privileged applications (which may also be remotely controllable by the MSO or its proxy), including the SDV "switch engine" function 224. In the exemplary implementation, the middleware contains the SDV switch API 224, and the DE 222 is coded to access the API in order to effect selective tuning of one or more tuners in the front end 460 of the DSTB to designated QAMs or other channels upon which the targeted secondary content is carried, and subsequent tuning back to the original (primary) program stream PID, as described in greater detail below with respect to FIGS. 6-6a.

Figure 4A:
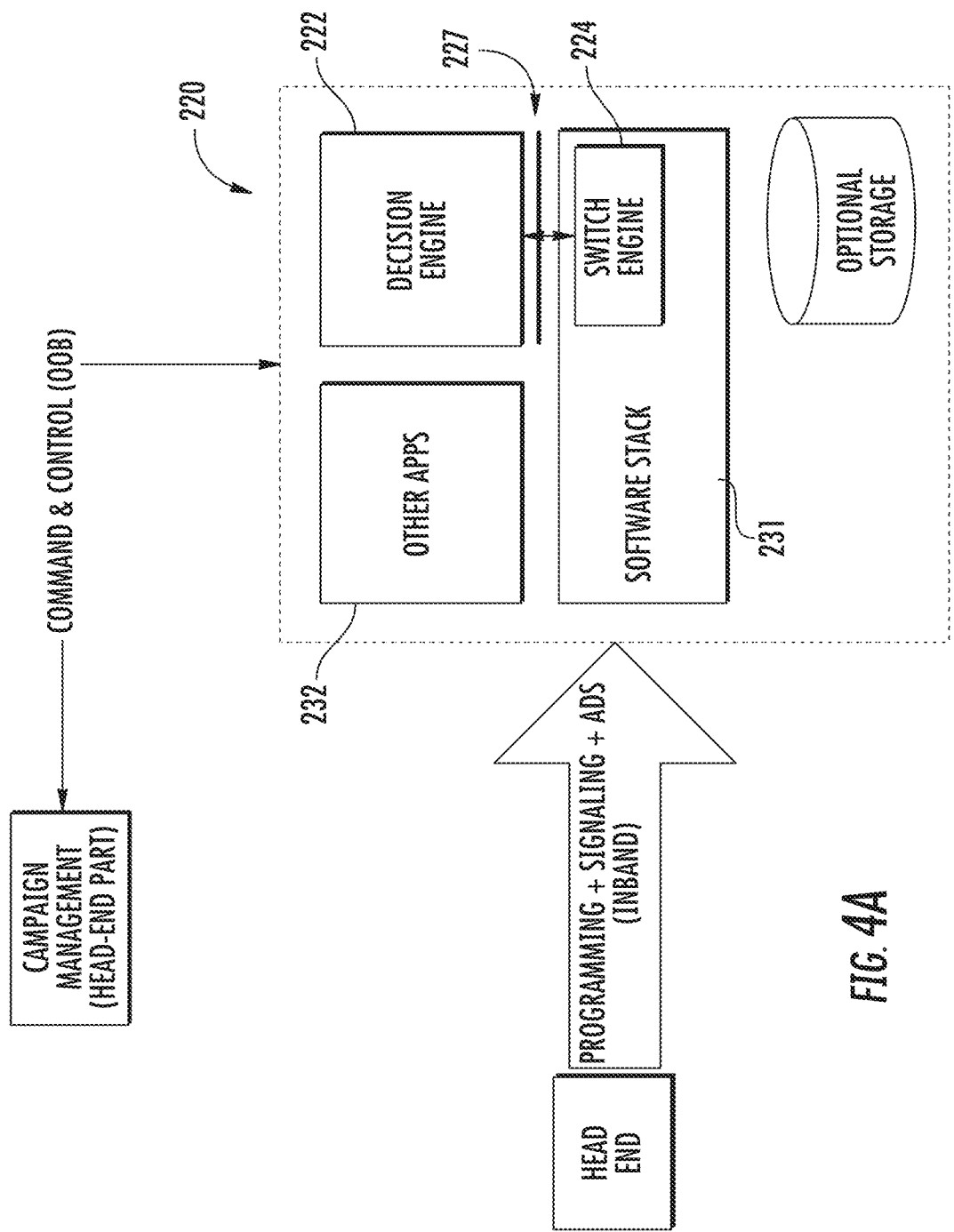
FIG. 4a is a logical block diagram illustrating one exemplary embodiment of data flows and interactions between hardware and software components of the client receiver device of FIG. 4.

Referring now to FIG. 4a, a logical block diagram illustrating one exemplary embodiment of data flows and interactions between hardware and software components of the client receiver device of FIG. 4 is shown and described. Specifically, the client device 220 (e.g., DSTB) include a software stack 231 of the type known in the software arts (e.g., a multi-layer stack with inter alia, PHY, network, and application layers such as according to the OSI model). In the exemplary embodiment, the stack 231 includes middleware having the switch engine functionality as a module 224 therein. Associated with the switch engine module 224 is an API which is accessible by one or more upper layer processes, including the DE 222 as shown. The DSTB 220 also includes other application layer processes 232, such as e.g., EPGs, on-screen help, etc.

As shown, the head end of the HFC network 101 (per the infrastructure 200 of FIG. 2) inserts both signaling and secondary content such as targeted advertisements into in-band downstream programming to the client device 220. As used in the context of the exemplary embodiment, "insertion" of the secondary content is actually via a different program stream (e.g., another SDV ID) which is also delivered in-band.

So-called "command and control" of the DE 222 occurs in this embodiment via the OOB HFC channels (i.e., low bandwidth "side channels" used for ancillary communication and the like), so as to provide profile and segmentation data to the DE 222 from the CPSU 206, receive impression data reporting, cause updates of or configuration changes to the DE 222, or otherwise control its operation remotely (including from third party campaign management entities which may be outside the MSO network, e.g., via the hub and SDS of the MSO network as shown in FIG. 2).

Figure 4B:
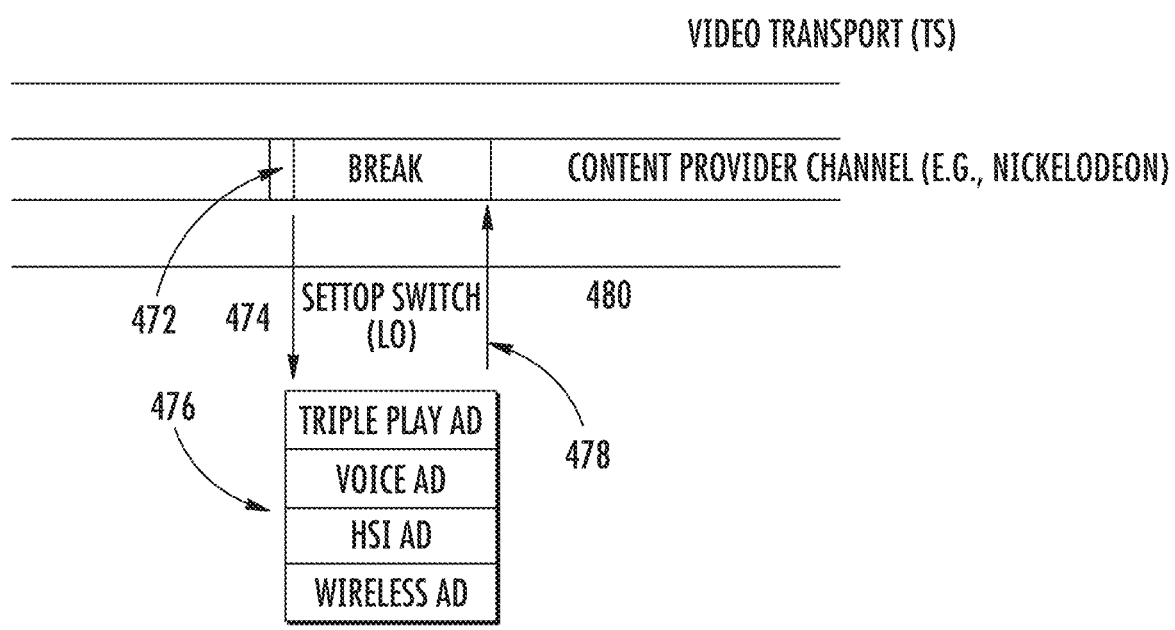
FIG. 4b is a logical block diagram illustrating one exemplary embodiment of signal flows and content conditioning for delivery of targeted secondary content to a legacy DSTB configured in accordance with the disclosure.

FIG. 4*b* is a logical block diagram illustrating one exemplary embodiment of signal flows and content conditioning for delivery of targeted secondary content to a legacy DSTB configured in accordance with the disclosure. As shown, the primary content stream (i.e., content provider network channel Nickelodeon in this example) is signaled using the SCTE-35 cues (step 472) shortly before the actual break, and then subsequently the client device 220 switches (step 474) to the targeted advertising content (copy) per step 476, which may include various types of media as shown. The secondary content copy is conditioned (e.g., per SCTE-138) including formatting per step 478, use of filler, encoding, etc., and upon completion the client device 220 is switched back to the primary content per step 480. FIG. 6*a* and its discussion subsequently herein provide a more detailed discussion of these signal flows in the content of such legacy DSTB.

Referring now to FIG. 5, another exemplary embodiment of client device hardware architecture useful with, inter alia, the architecture 260 of FIG. 2*c* is illustrated, such as for the mobile IP-enabled clients 282. As shown, the client device 282 is served by a service provider (e.g., MSO HFC) network "drop", such as a DOCSIS-enabled cable modem (CM) 502. The CM 502 generally comprises one or more front-end RF network interfaces 560 including tuner(s) for DOCSIS data communications with other entities of the content delivery network 101 and/or the managed network headend 150, a processor 550, a memory apparatus 554, mass storage 570 (e.g., solid state drive (SSD), HDD, and/or NAND/NOR flash memory), and a plurality of backend or local interfaces 562 such as e.g., an III Std. 802.11 (Wi-Fi) air interface. A conditional access (CA) module 576 is also included, such as one compliant with the CableCard, MS Silverlight, and/or other DRM-based or non-DRM-based approach such as DCAS (downloadable conditional access).

The CM 502 of FIG. 5 also includes a user "local" interface 556, such as for front panel device control and illumination, receipt of local user inputs, etc.

In the illustrated embodiment, the client 282 (e.g., a wireless-enabled tablet, smartphone, Smart TV, etc.) includes the DE logical process 222 implemented as computerized logic rendered as code and operative to run on the respective client 282. In one embodiment, the DE client 222 comprises a software application ("app") that is downloaded onto the client device 282 either at time of install or subsequently thereafter, such as via an "app store" or similar functionality, or by insertion of media such as CD-ROM or USB flash drive. The MSO or a proxy thereof may also provide the DE app 222 to the user for install on the client 282 such as via download of an executable, and subsequent remote execution thereof via the processor apparatus of the client 282.

The exemplary client device 282 shown in FIG. 5 also includes a complementary wireless interface of sufficient bandwidth to wirelessly receive media data such as the primary and secondary content described above; in this case, an OFDM-based IEEE-802.11 interface is used, although this is merely exemplary. For instance, an LTE-A cellular data interface may be used with equal success.

Also resident on the client device 282 is other application software 523 configured to (i) enable user browsing of the necessary content source or portal (e.g., MSO URL) to select primary content, (ii) decode and render the selected and downloaded primary content (e.g., an AVC or H.264 codec or media player) as well as any "inserted" secondary content, (iii) implement any DRM or similar content protection policies (if any).

Methodology—

Figure 6:
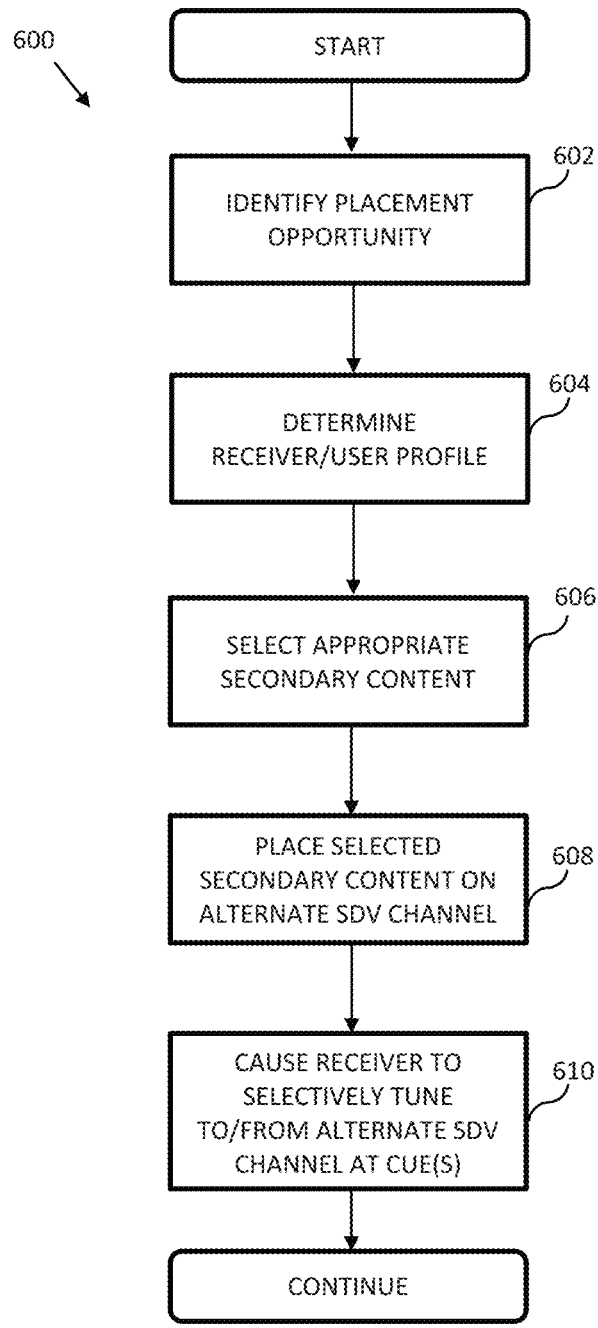
FIG. 6 is a logical flow diagram illustrating one embodiment of a generalized method of selecting and providing targeted secondary content according to the present disclosure.
Figures 1, 6A:
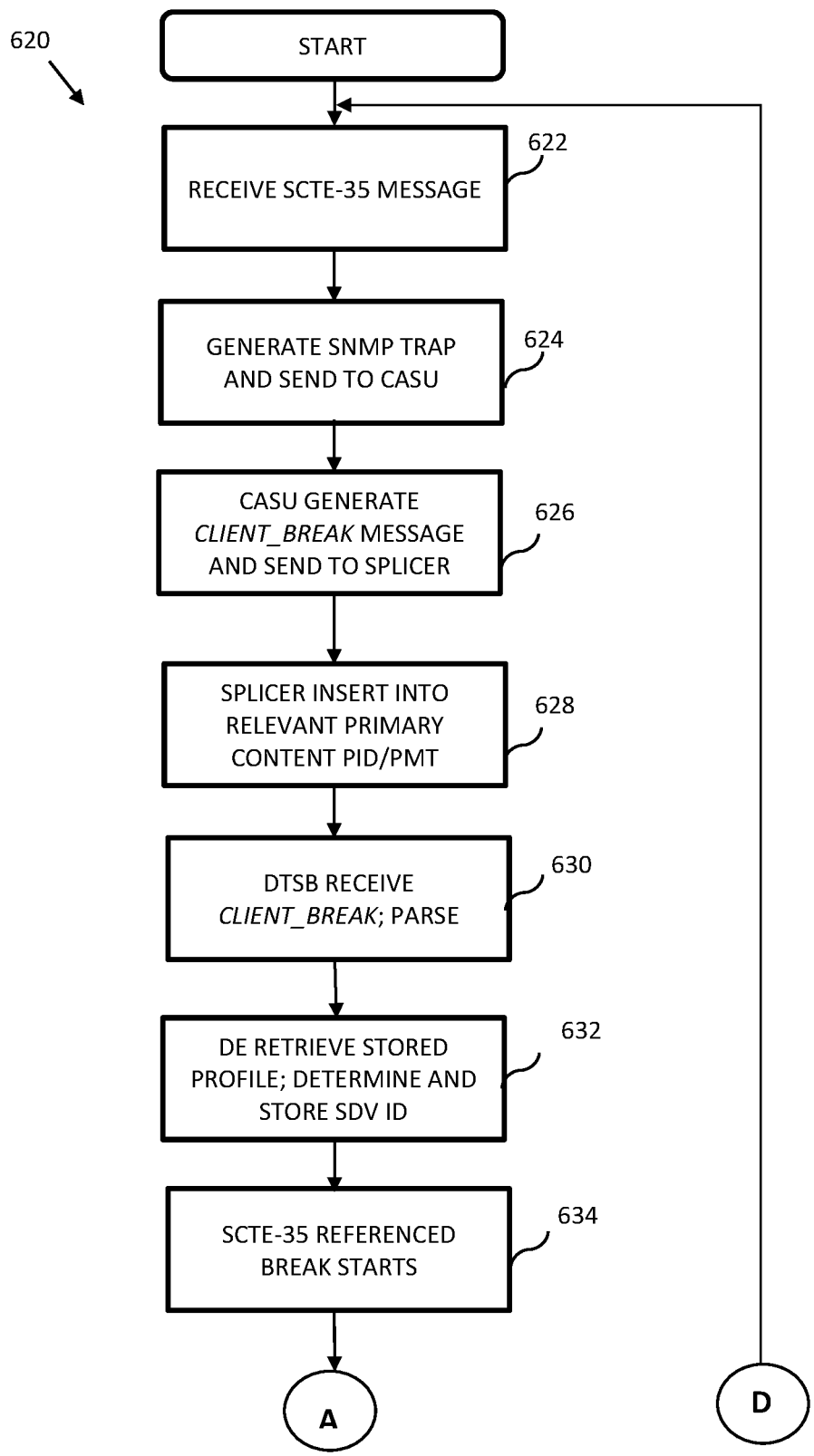
FIG. 6a is a logical flow diagram illustrating one particular implementation of the generalized method of FIG. 6, in the context of a cable television network providing linear or non-linear programming services to a plurality of legacy DSTBs.
Figures 2, 6A:
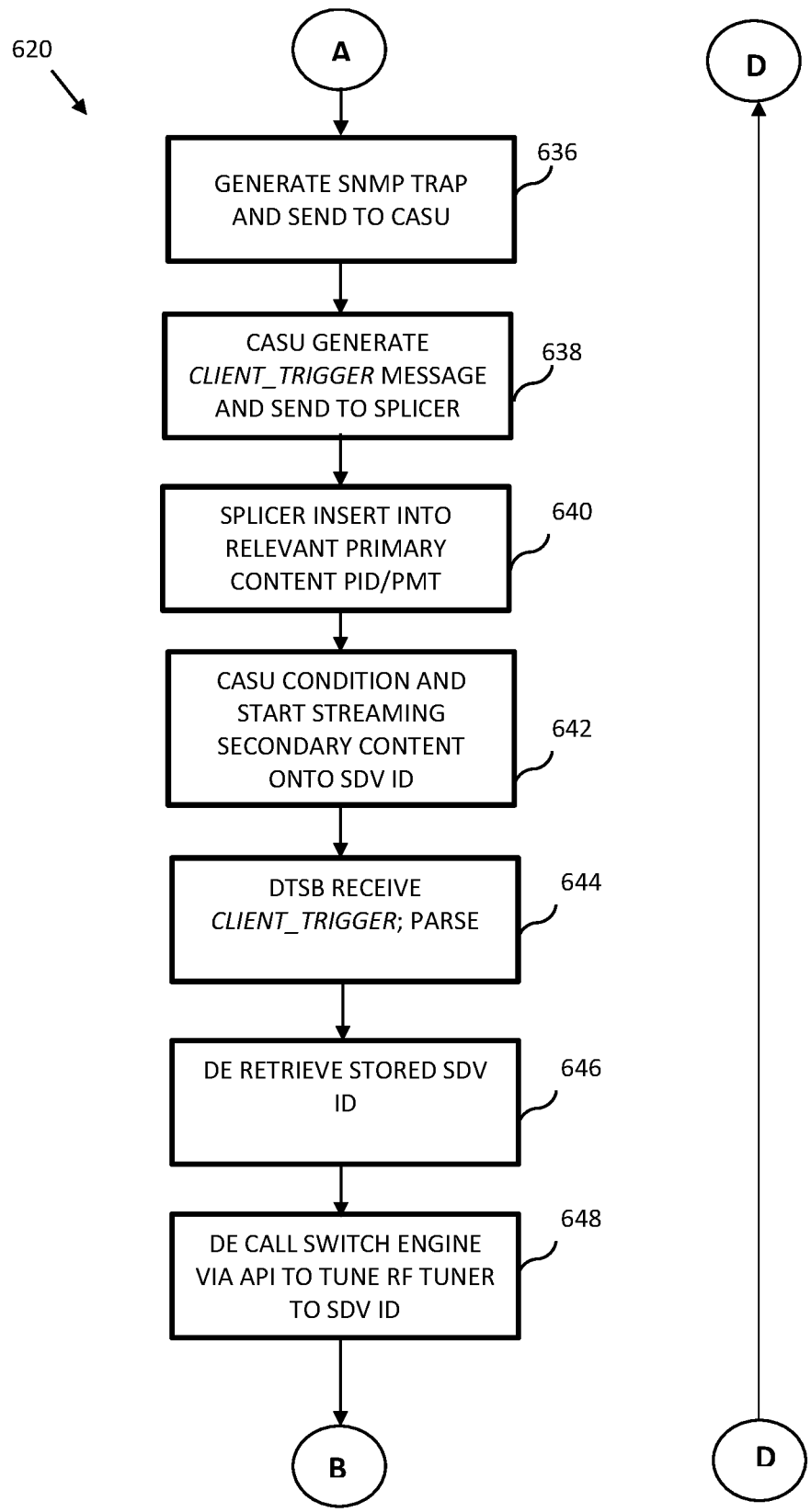
Figures 3, 6A:
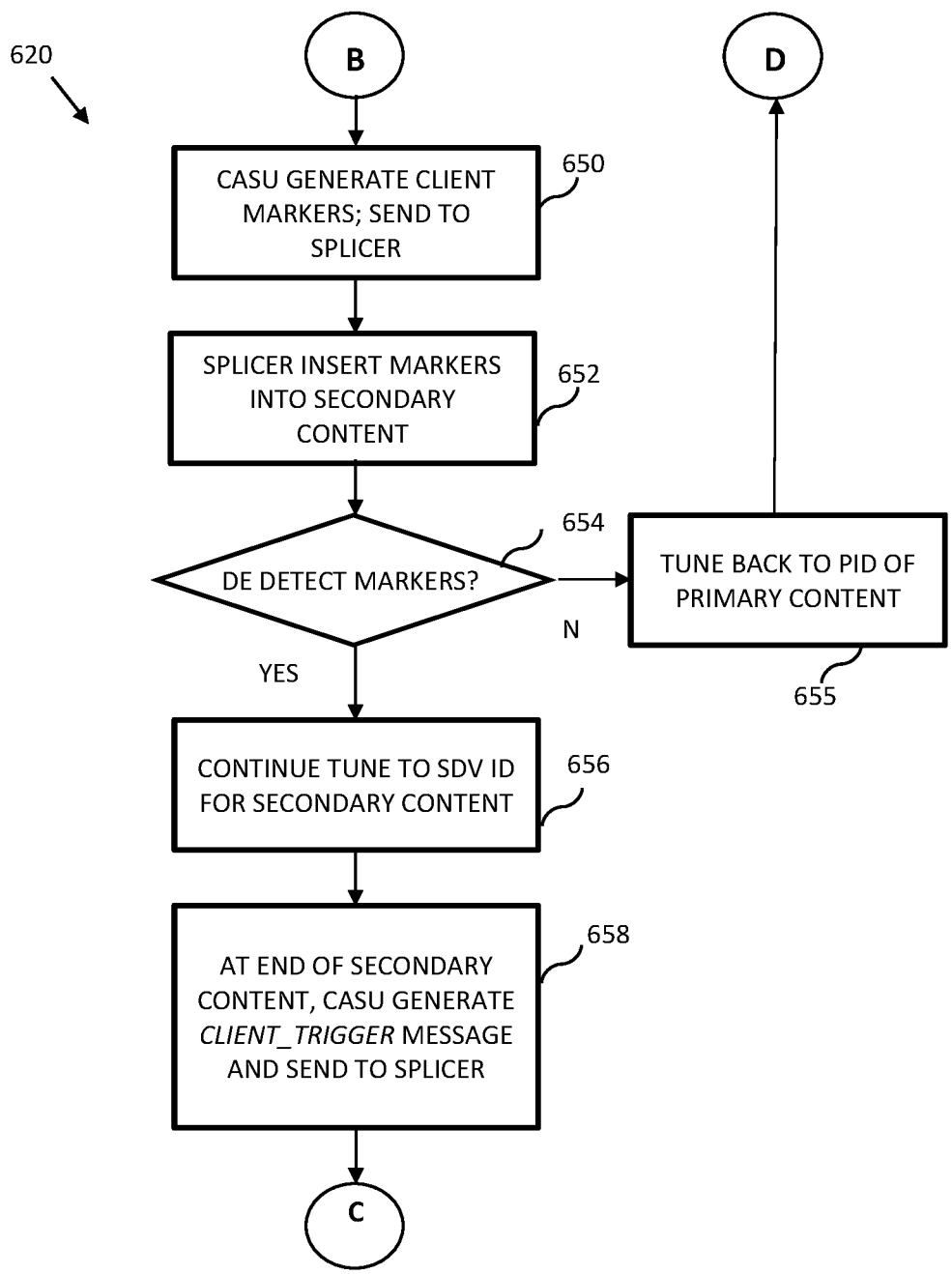
Figures 4, 6A:
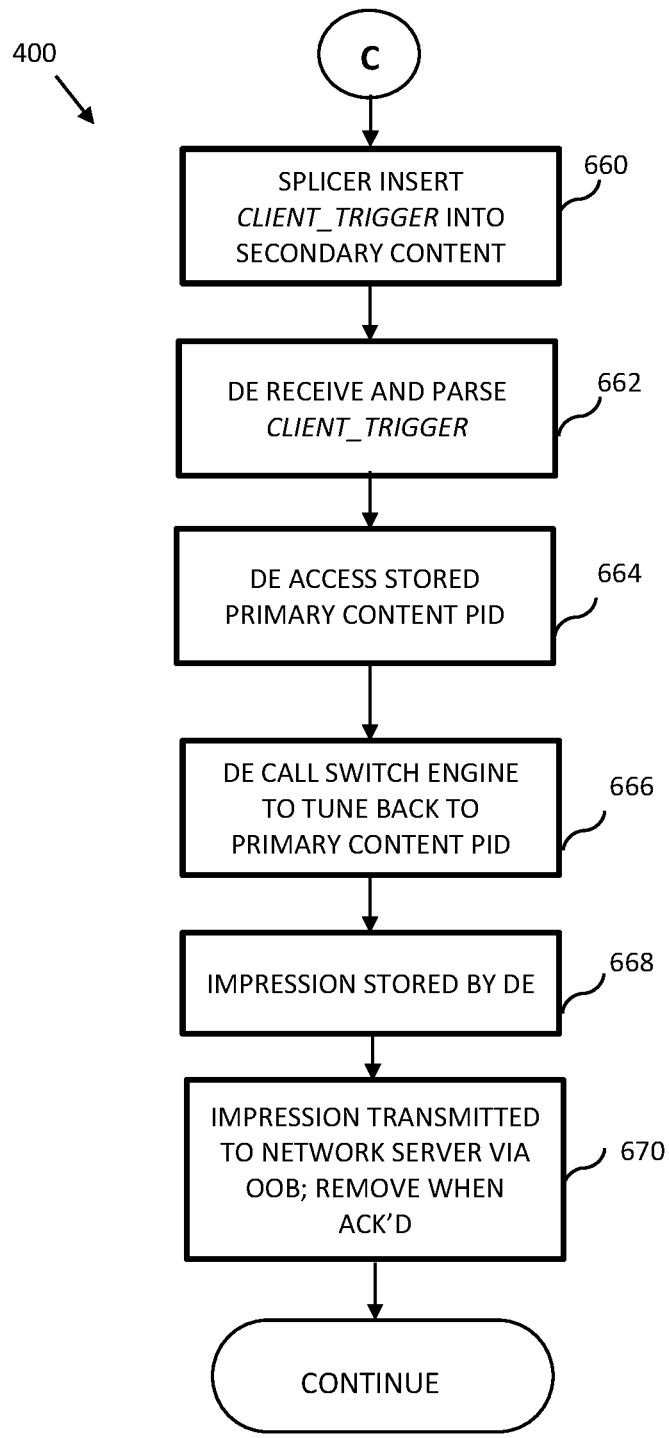

FIG. 6 is a logical flow diagram illustrating an exemplary generalized method for selecting and inserting secondary content within a managed network environment (such as within the architecture 200 of FIG. 2), in accordance with one embodiment of the present disclosure.

As shown, the general method 600 includes first identifying one or more insertion or placement opportunities within primary content (step 602). As described in greater detail below with respect to FIGS. 6*a* and 6*b*, this may take the form of cues or other data inserted into media streams, signaling from third party entities, etc.

Next, per step 604, a user and/or receiver profile is obtained. For example, in one embodiment, the user's receiver device (e.g., DSTB 220 or portable IP-enabled device 228) has unique identifying information such as a MAC address or IP address associated therewith, and this information is correlated to a user (subscriber) account within the MSO subscriber database which also contains demographic, geographic, psychographic, and other information of possible use (e.g., subscription level, recently selected OD content, etc.) for which the subscriber (and any associated household members) can be "profiled" in terms possible correlation to secondary content. As described previously herein, this analytical capability in one implementation resides within one or more cloud-based entities (either MSO- or third-party operated algorithms), or to varying degrees within the DE 222 of the client device.

Per step 606, the appropriate secondary content is selected based on the aforementioned profiling. Such selections may be made "on the fly" (e.g., at time of signaling of the impending insertion opportunity), or in advance (e.g., based on characterization of the individual secondary content by the provider or source as being applicable to certain profiles, demographics, geographics, psychographics, etc.).

The selection may also take into account attributes of the primary content within which the secondary content will be inserted. For example, if the primary content comprises a children's show or movie, it may be fairly safe to assume that the primary viewer in the household consuming the content is not an adult, and hence more adult-oriented secondary content may not be appropriate (or even if an adult is co-consuming, such adult-oriented content is not appropriate for the child). Such information regarding the primary content can be gleaned for example from the descriptive metadata associated with the primary content (e.g., rating, origin, content descriptors or codes, etc.).

Per step 608, the selected secondary content is placed onto one or more delivery channels (e.g., the SDV "feeder"

previously referenced) which are accessible to the user receiver device. As described elsewhere herein, such placement (and subsequent removal) may also be in a "just in time" fashion, such as where the secondary content is delivered to the edge device or switch within the network (see FIG. 1c) at or just before the insertion break in the primary content occurs, thereby conserving bandwidth. Moreover, the secondary content can be "swapped" for other content that is being removed; e.g., another advertisement on the feeder channel (consumed by say another DSTB or subset of the MSO audience) may be slated for removal at or before time of insertion of the new advertisement, and hence a largely zero-sum effect on bandwidth consumption is achieved.

In yet another alternative, one or more time-shifted copies of the same targeted advertisement may be placed on different delivery channels accessible by the SDV logic, such that in the event of a subsequent time-shifted user (e.g., another DSTB watching another primary content stream yet having an insertion opportunity calling for the same advertisement), the time-shifted copy can be accessed by the user so long as insertion criteria such as remaining time period, etc. are met.

It is also appreciated that the insertion logic of the system 200 may further be configured to, based at least on detection that the appropriate targeted advertising is not present or available on the alternate or feeder SDV channel, identify a remaining time period associated with the one or more insertion opportunities, and select second appropriate advertising so as to fit within said remaining time period. For example, a 30-second spot may not be available at time t=0 (start of the break) based on e.g., absence of marker messages as described below with respect to FIG. 6a, and accordingly a second or alternate advertisement of duration 25 seconds may be selected for delivery (i.e., tuned to by the DE 222). Moreover, any gaps in the schedule (i.e., the lost approx. 30 seconds minus 25 seconds or approx. 5 seconds) may be filled with either filler somewhat similar in nature to SCTE-138 Sections 8.0, et seq. (i.e., black pictures or silent audio), or yet other content such as e.g., user-specified content (e.g., "wallpaper" and/or music of the user's choosing, other SDV channels which can be switched in), or even user-generated or local content (e.g., security camera feeds, webcam feeds, etc.) in the case of URL-based IP content.

Lastly, per step 610 of the method, 600, the receiver device (e.g., DSTB) is tuned from the primary content channel to an alternate channel (e.g., via the SDV logic of the network and switch engine 224 under control of the DE 222, or to a new URL for streaming media.

FIG. 6A illustrates one particular implementation of the method 600, in the context of the architecture 200 of FIG. 2. As shown, the method 620 first comprises receiving an SCTE-35 message at the advertising server 208, such as from a content source of the primary content (e.g., a network) per step 622, alerting to an impending insertion opportunity within a given program (PID).

Per step 624, the server 208 generates an SNMP (simple network management protocol) "trap" message to alert the CASU server 204 of the impending insertion opportunity for the PID.

Per step 626, the CASU 204 generates a client break such as via a "DPI" (SCTE 35) trigger for transmission to the splicer 210 to insert in the primary program stream, and ultimate delivery to the CPE. In the exemplary embodiment, the message is generic (i.e., addressed as a "multicast" and thereby extractable by all CPE or clients receiving the program stream), although it will be appreciated that specific addressing may be used as desired. The message also includes the appropriate PID and other necessary information (e.g., QAM frequency) to ensure insertion of the message into the appropriate primary content stream only.

Per step 628, the splicer 210 inserts the message into the primary program stream (i.e., the appropriate PID of the PMT), and the QAMs deliver the program, stream via the HFC distribution network to the clients 220.

It will also be appreciated that the exemplary implementations described herein may further include insertion of one or more "heartbeat" messages within the secondary content stream, such as via the splicer 210. These heartbeat message may be used for, inter alia, detection by a receiving client 220 (and its application 222) of an erroneous tune or switch event, network or equipment failure, or other anomalous condition which prevents the secondary content stream from being delivered to the client. Specifically, in one variant, the splicer inserts SCTE-35 messages into the secondary content stream every N seconds, and the client application 222 is configured to, during any tune-away from the primary content stream, look for such heartbeat messages within the received secondary content stream. If such messages are not detected according to a prescribed logic (e.g., every message must be received, every message must be received and it must be received within a prescribed time window or periodicity, at least every other message must be received, etc.), then the client application 222 will cause the switch API/application 224 to invoke a tune back to the primary content, so as to avoid the user seeing "dead air" for the duration of the advertising break.

The foregoing heartbeat messages can also be used for other purposes, such as e.g., to passively cue the client application 222 to take other actions such as rendering of some locally stored content or display element on the screen concurrent with the then-showing advertisement, sampling or logging of the state of one or more parameters associated with the client device, or yet other actions. For instance, one variant of the client application 222 may be configured to count the heartbeats received, and based on knowledge of the total duration of the advertisement, identify a prescribed place within the advertising stream at which to invoke such actions. For example, a 30-second advertisement may include one heartbeat message every 2 seconds (e.g., 14 total), and by counting that 7 of the 14 heartbeats have been received know that it is approximately at the middle of the run duration of the advertisement.

Per step 630, each client receives the client break message, and the DE 222 extracts and parses it for further processing and storage.

Per step 632, the DE 222 accesses and evaluates the (previously) obtained and stored profile data sent from the CPSU 206 for selection of an appropriate SDV channel/source ID over which the secondary content will be delivered.

In one exemplary implementation, the "targeting" information derived based on the evaluation of step 632 is transmitted in one or more profiles to each affected client (e.g., DSTB). This transmitted profile includes, inter alia, information for each DSTB as to which source to select (including the correct source or program ID), and is tagged with an advertisement identifier for reference. The previously discussed digital program insertion (DPI) trigger (received seconds before the actual delivery of the advertisement) identifies the impending advertisement break, including the appropriate advertisement identifier. Based on this identifier, the DSTB then knows (based on the previously sent profile) which source or program ID to which to tune for the appropriate advertising content to be rendered on the DSTB.

Per step 634, the primary content insertion break starts (based on the existing SCTE 35 trigger in the primary content video stream), the client process operating on the relevant DSTB perform a virtual channel switch when it identifies the triggering PID value sent from the CASU, and the advertising server 208 generates a second SNMP trap message to the CASU to alert the CASU 204 of the break (step 636).

Per step 638, the CASU generates a client_trigger message and sends it to the splicer 210. Per step 640, the splicer inserts the message into the program stream identified by the PID for delivery to the client(s) 220.

Per step 642, the CASU 204 conditions and begins streaming the selected secondary content onto the appropriate SDV channel identified by the SDV ID of step 632. As previously noted, the "selected" secondary content may comprise content which was previously selected (such as by a third party campaign manager) for correlation with a particular subscriber profile or subset of profiles (or "template"), or alternatively may be selected on-the-fly based on, e.g., primary content context or subject matter, prevailing events (e.g., breaking news), advertiser updates (e.g., car maker introducing brand new model), or yet other considerations.

Per step 644, the client 220 receives the client_trigger message, and extracts and parses it for processing.

Per step 646, the DE 222, upon processing the message of step 644, accesses the previously stored SDV ID and generates an inter-process communication (i.e., API "call" to the switch engine API of the middleware 224) per step 648 to cause the middleware to invoke a tune event of the relevant RF tuner(s) to the appropriate frequency associated with the SDV ID. In one such sequence, the DE provides the SDV ID to the switch engine API 224, which then creates and transmits a message with the correlated SDV ID to a network-side SDV server 196 or switch 194 (see FIG. 1c), wherein the latter provides a frequency assignment to the client device 220 in effect telling the client (and its tuner) what frequency on which to access the particular SDV ID. Other schemes may also be used, the foregoing being merely exemplary.

During delivery of the secondary content via the designated SDV channel, the CASU 204 generates a series of client marker messages (in one embodiment, SCTE-35 DPI triggers) per step 650, which basically function as keep-alive messages for the SDV tune-away from the primary content. For instance in one variant, the messages are inserted via the splicer 210 every prescribed interval (e.g., 0.1 seconds) per step 652; the DE receives and parses the messages (step 654) so as to maintain the SDV ID tune-away event per step 656. If the markers are not present, the DE causes tuning back to the primary content PID per step 655, and play of the primary content at the client device 220 continues (largely unnoticed by the viewer due to the short interval).

Per step 658, when the end of the break is detected (such as via one or more additional DPI triggers specifically indicative of the end of the break), the CASU 204 generates another client_trigger message and causes insertion by the splicer 210 (per step 660) into the secondary content stream so as to affirmatively and cleanly transition from the advertising content to to the primary content per step 662. It will also be appreciated that multiple advertisements may be sequenced within the available break (e.g., four 30-second spots in a two-minute break). In one such implementation, each PID associated with its respective advertisement stream has a trigger or termination message inserted at or near its end to indicate to the client application 222 to queue the next sequential PID in its profile (i.e., by invoking a switch via the SDV system as previously described.

In another implementation, the client application 222 includes code which extracts an advertisement duration value for each advertisement, and hence in effect knows when to make the switch to the next advertisement (or back to the primary stream) even without a trigger message. In such case, a trigger message indicating the end of the sequence of advertisements (i.e., the end of the break) may be used to effect a smooth transition back to the primary stream if desired.

It will also be appreciated that the aforementioned heartbeat messages may, where used, act as "end of content" markers as well. For example, where a heartbeat message is purposely inserted to "coincide" with the insertion point where an "end of advertisement" message would nominally be inserted, the latter may be obviated in favor of the former. Here, the term "coincide" refers to the fact that the insertion of the heartbeat should account for any processing delays by the client in the heartbeat logic (e.g., if the latency of the client causing the tune back to the primary stream, or the next advertisement in the sequence if any is a known amount, the last heartbeat for that PID should be inserted temporally ahead of the desired transition point by that known latency value).

In a less complex paradigm, the heartbeat can merely be used as a "hard tune" event if the latency of the logic is short enough; i.e., if the time between failure to detect a requisite heartbeat and the retune back to the primary PID is short enough, so as to not cause a significant discontinuity or transition for the viewer.

At step 664, the DE accesses the stored primary content PID/SDV ID, and per step 666 makes a call to the switch engine API 224 to instigate a re-tune back to the primary content.

Per step 668, an "impression" is stored by the DE in the client 220 (e.g., in memory), and per step 670, the impression is transmitted to the CPSU 206 for further processing. In one implementation, multiple impressions are aggregated by the client/DE 222 over time, and then transmitted en masse to the CPSU 206 at a randomized time (or alternatively based on available transmission medium access, such as via a CSMA/CD or other scheme). Once the impressions have been received by the CPSU (or a proxy thereof), an ACK is sent confirming the same, and the DE 222 processes the ACK to enable logic to delete or enable overwrite of the stored impressions, so as to inter alia, make additional storage space within the client device memory.

Figures 1, 6B:
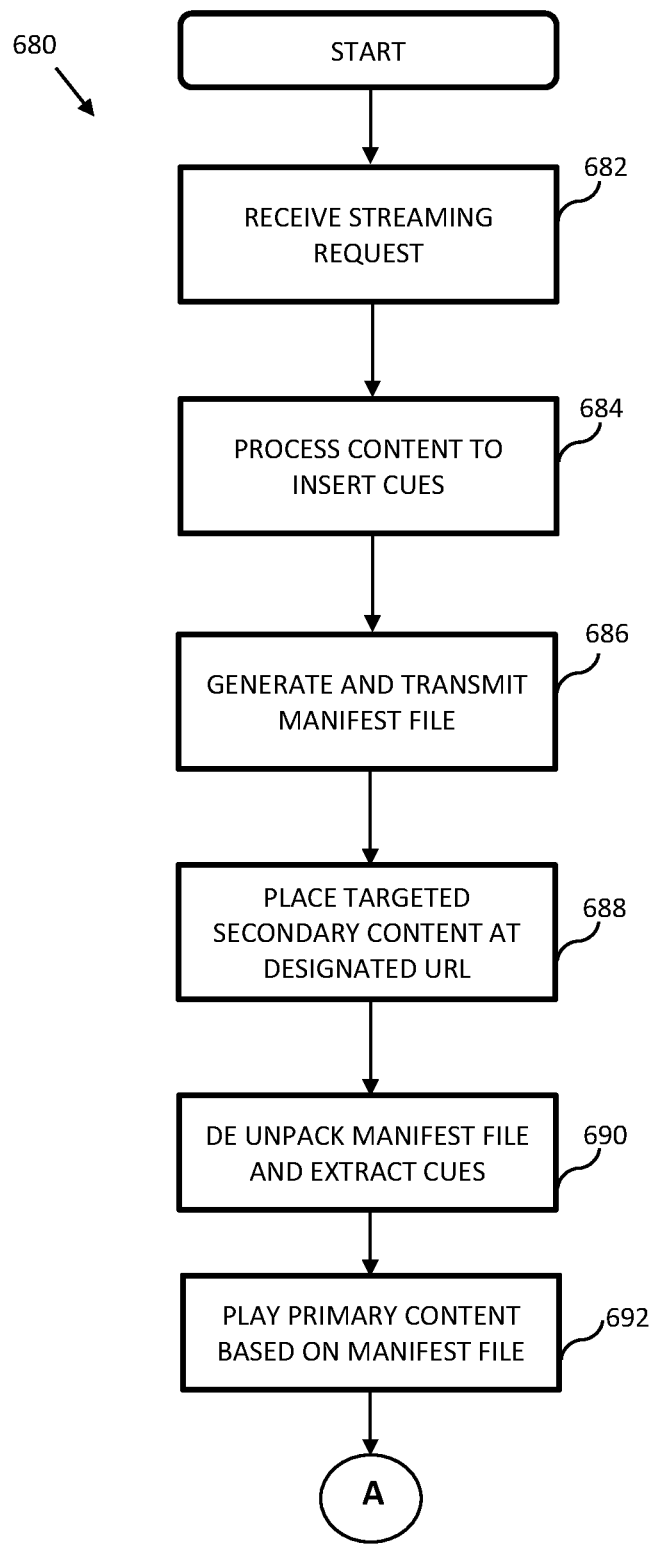
FIG. 6b is a logical flow diagram illustrating another particular implementation of the generalized method of FIG. 6, in the context of a cable television network providing IP-based streaming content services to subscribers via a portable tablet or smartphone, or "Smart TV".
Figures 2, 6B:
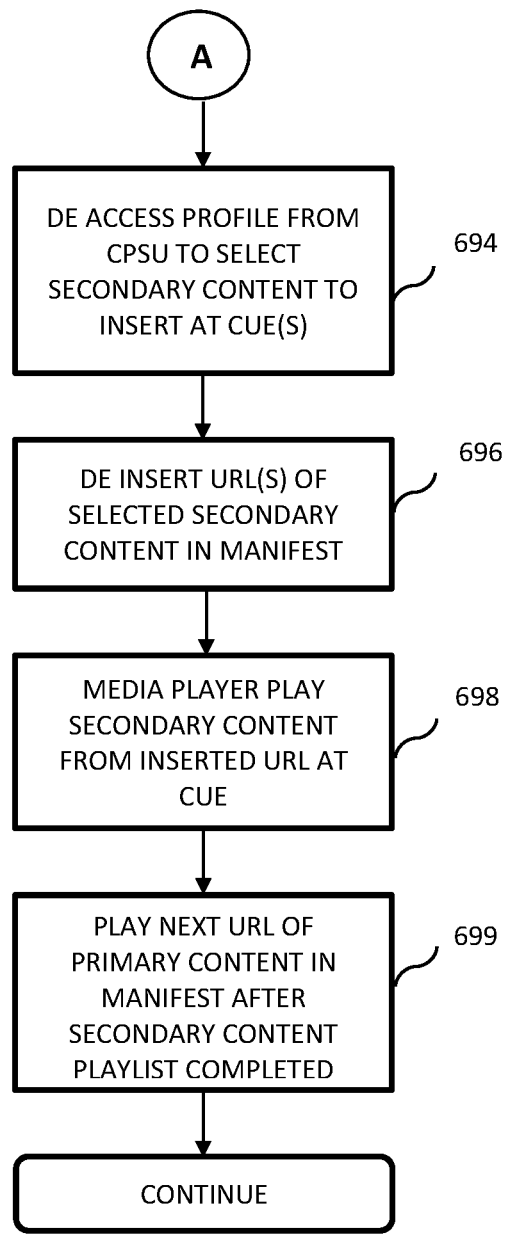

FIG. 6b is a logical flow diagram illustrating another particular implementation of the generalized method of FIG. 6, in the context of a cable television network providing IP-based streaming content services to subscribers via a portable tablet or smartphone, or "Smart TV".

As shown, the method 680 of FIG. 6b begins with the MSO (or designated server of a third party) receiving a streaming request from an IP-enabled client device, such as by a user clicking on a "Play" icon within a media player or browser app running on the client device 282 (See FIG. 2c) at step 682.

At step 684, the MSO or third party server processes the requested media stream (which may be obtained locally, or from a content library or other source as described above) to insert one or more cues or timing references within the stream. For instance, in one embodiment, the stream includes data indicative of both the start point and end point of the planned "break" within the packet stream of the processed content. These temporal references (or yet other types of data) may also be included as separate "files" as part of the manifest file generated per step 686, or as metadata.

At step 686, the packager 270 (or other entity within the network) generates the manifest file and transmits it via e.g., DOCSIS modem or other transport to the requesting client device 282.

The CASU 204, CPSU 206 (FIG. 2), or other entity within the network then causes placement of prescribed secondary content at a designated URL, e.g., under direction of the third party campaign manager. For instance, the aforementioned car maker may want to target every MSO subscriber who previously purchased or leased one of their cars, and advertising for say a new model may be specified by the campaign manager.

To that end, the CPSU 206 also sends the client 282 with DE app a profile (similar to those described supra) to specify URLs for various demographics, psychographics, etc. (not shown).

Per step 690, the receiving client device's DE app unpacks the manifest file and extracts the cue (timing information), and if needed, calculates the available break time.

At step 692, the first URL in the manifest is then played by the client device's media player, and thereon in succession until the advertising break (timing cue) is reached.

At that point (or shortly before), per step 694, the DE app accesses the stored profile and selects secondary content for insertion (i.e., play by the media player app). The selected URL(s) for the secondary content are inserted into the manifest at the cue per step 696.

The media player then executes the first secondary content URL in the manifest (i.e., next on the play list), and begins playing the secondary content streamed from the web server serving that URL, per step 698.

Finally, at step 699, the media play executes the final URL in the secondary content, and reverts to the next primary content (requested stream) URL in the playlist, which in effect picks up where the user left off at the cue or break.

It is appreciated that while the foregoing methodology 680 describes a scenario where the network-side entity or entities insert cues or timing references into the streamed primary content, the present disclosure envisages other permutations, including for instance: (i) the network side entity or entities inserting the actual URL(s) for the secondary content into the primary stream; (ii) the DE or other process on the client device 282 selecting the insertion points for the secondary content; and (iii) a third party campaign manager and/or server inserting the cues/timing information, and/or the secondary content URLs, into the stream.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be appreciated that while certain steps and aspects of the various methods and apparatus described herein may be performed by a human being, the disclosed computer technology improvements are computer-implemented, and computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized network apparatus configured for substantially automated insertion of digital secondary content for use by one or more users of a managed content distribution network, the computerized network apparatus comprising:
    server apparatus comprising:
        processor apparatus;
        first interface apparatus in data communication with the processor apparatus configured to communicate with a secondary content processing entity of the managed content distribution network;
        second interface apparatus in data communication with the processor apparatus and configured to communicate with one or more network entities configured to select appropriate digital secondary content for respective ones of a plurality of computerized user receiver devices;
        third interface apparatus in data communication with the processor apparatus configured to communicate with the plurality of computerized user receiver devices via at least one or more communication channels of the managed content distribution network; and
    storage apparatus in data communication with the processor apparatus, the storage apparatus comprising at least one computer program configured to, when executed on the processor apparatus:
        receive, via the first interface apparatus, indication of an impending insertion opportunity within a digital program stream being accessed by a particular one of the plurality of computerized user receiver devices;
        receive, via the second interface apparatus, data indicative of a communication channel over which the particular one of the plurality of computerized user receiver devices can access digital secondary content, the digital secondary content having been determined to be applicable to the particular one of the plurality of computerized user receiver devices; and
        transmit, via the third interface apparatus, at least a portion of the data indicative of the communication channel to an insertion process of the managed content distribution network, for insertion thereof by the insertion process within the digital program stream.

2. The computerized network apparatus of claim 1, wherein the indication of the impending insertion opportunity within the digital program stream being accessed by the particular one of the plurality of computerized user receiver devices comprises an SCTE-35 compliant cue issued by a computerized network entity that is a source of the digital program stream.

3. The computerized network apparatus of claim 2, wherein the communication channel comprises a radio frequency (RF) QAM channel accessible to the particular one of the plurality of computerized user receiver devices via a switched digital video (SDV) switching device of the managed content distribution network, and the insertion of the at least portion of the data by the insertion process within the digital program stream comprises insertion into a program mapping table (PMT) via a splicing process of the managed content distribution network.

4. A computerized method of substantially automated insertion of digital secondary content for use by one or more users of a content distribution network, the computerized method comprising:
receiving a first data indicative of an impending insertion opportunity within a digitally rendered program stream;
based at least on the first data, generating, via a secondary content management process of the content distribution network, second data relating at least to one or more source channels over which digitally rendered secondary content is to be delivered to one or more computerized client devices; and
transmitting at least a portion of the second data to an insertion process of the content distribution network, for insertion, by the insertion process, of the at least portion of the second data by the insertion process within the digitally rendered program stream.

5. The computerized method of claim 4, wherein:
the one or more source channels comprise a radio frequency (RF) QAM channel accessible to the one or more computerized client devices via a switched digital video (SDV) switching device of the content distribution network; and
the insertion, by the insertion process, of the at least portion of the second data within the digitally rendered program stream comprises insertion of the at least portion of the second data into a program mapping table (PMT) via a splicing process of the content distribution network.

6. The computerized method of claim 4, further comprising:
based at least on the received first data, generating third data; and
transmitting the third data to the secondary content management process to alert the secondary content management process of the impending insertion opportunity.

7. The computerized method of claim 6, further comprising:
causing inserting, via the insertion process and based at least on the second data, data relating to the one or more source channels into one or more primary content streams; and
based on a start of the insertion opportunity, generating fourth data and transmitting the fourth data to the secondary content management process.

8. The computerized method of claim 7, further comprising:
based at least on the fourth data, generating, via the secondary content management process, fifth data relating at least to the start of the insertion opportunity, and transmitting the fifth data to the insertion process;
causing inserting, via the insertion process and based at least on the fifth data, data indicative of the start of the insertion opportunity into the one or more primary content streams; and
causing transmission of the digitally rendered secondary content via the one or more source channels.

9. The computerized method of claim 8, further comprising:
generating, via the secondary content management process, sixth data relating at least to an end of the insertion opportunity, and transmitting the sixth data to the insertion process;
causing inserting, via the insertion process and based at least on the sixth data, data indicative of the end of the insertion opportunity into the one or more primary content streams; and
causing cessation of transmission of the digitally rendered secondary content via the one or more source channels.

10. The computerized method of claim 9, wherein:
the receiving of the first data indicative of the impending insertion opportunity comprises receiving a SCTE-35-compliant message;
the generating of the second data comprises generating a client break message;
the transmitting of the third data to the secondary content management process comprises transmitting a simple network message protocol (SNMP) trap message to the secondary content management process;
the generating of the fourth data comprises generating a second SNMP trap message;
the generating of the fifth data comprise generating a first client trigger message; and
the generating of the sixth data comprise generating a second client trigger message.

11. The computerized method of claim 4, further comprising receiving, via an out-of-band (OOB) channel of the content distribution network, data indicative of a receiver device having tuned to the one or more source channels to receive the digitally rendered secondary content.

12. The computerized method of claim 11, wherein the receiving, via the OOB channel of the content distribution network, of the data indicative of the receiver device having tuned to the one or more source channels to receive the digitally rendered secondary content comprises receiving, via the OOB channel which utilizes a connection-less communication protocol, the data indicative of the receiver device having tuned to the one or more source channels to receive the digitally rendered secondary content.

13. A computer readable apparatus comprising a non-transitory storage medium, the non-transitory storage medium comprising at least one computer program having a plurality of instructions, the plurality of instructions configured to, when executed on a processing apparatus, cause a computerized network apparatus to:
obtain first data relating to one or more insertion opportunities within a programming content stream being delivered over a content distribution network to one or more computerized client devices;
obtain second data indicating a communication channel to be utilized for delivery of digital secondary content for the one or more insertion opportunities to the one or more computerized client devices; and transmit at least a portion of the second data indicative of the communication channel to an insertion process of the content distribution network, for insertion thereof by the insertion process within the programming content stream.

14. The computer readable apparatus of claim 13, wherein the first data relating to the one or more insertion opportunities comprises an SCTE-35 compliant cue issued by a computerized network entity that is a source of the programming content stream.

15. The computer readable apparatus of claim 13, wherein:
the communication channel comprises a radio frequency (RF) QAM channel accessible to the to the one or more computerized client devices via a switched digital video (SDV) switching device of the content distribution network; and
the insertion of the at least portion of the second data by the insertion process within the programming content stream comprises insertion of the at least portion of the second data into a program mapping table (PMT) via a splicing process of the content distribution network.

16. The computer readable apparatus of claim 13, wherein the plurality of instructions are further configured to, when executed on the processing apparatus, cause the computerized network apparatus to:
cause the one or more computerized client devices to tune to the communication channel at a prescribed time associated with the one or more insertion opportunities to access the digital secondary content;
determine that, after the prescribed time, the digital secondary content is not present or available on the communication channel; and
cause transmission of third data to the one or more computerized client devices, the third data relating to an alternate channel to which the one or more computerized client devices can tune so as to access second digital secondary content.

17. The computer readable apparatus of claim 16, wherein:
a remaining time period associated with the one or more insertion opportunities exists; and
the second digital secondary content is selected so as to fit within the remaining time period.

18. The computer readable apparatus of claim 13, wherein:
the programming content stream comprises the programming content stream being delivered over a first modulated radio frequency (RF) channel;
the communication channel comprises a second modulated RF channel;
the insertion of the at least portion of the second data by the insertion process within the programming content stream is configured to cause the one or more computerized client devices to selectively switch from the first modulated RF channel to the second modulated RF channel, the selective switch occurring substantially contemporaneous with a start of the one or more insertion opportunities to access the digital secondary content;
the plurality of instructions are further configured to, when executed on the processing apparatus, cause the computerized network apparatus to:
based on a completion of the digital secondary content occurring substantially contemporaneous with an end of the one or more insertion opportunities, cause the one or more computerized client devices to selectively switch from the second modulated RF channel back to the first modulated RF channel to return to access of the programming content stream via the first modulated RF channel; and
causing removal of delivery of the digital secondary content from said second modulated RF channel.

19. The computer readable apparatus of claim 13, wherein the plurality of instructions are further configured to, when executed on the processing apparatus, cause the computerized network apparatus to:
receive impression data, the impression data based at least on functional activity of the one or more computerized client devices, the functional activity comprising data indicative of a viewing of the digital secondary content by at least one user of the one or more computerized client devices; and
transmit data representative of an acknowledgment of the impression data, the data representative of the acknowledgment enabling the one or more computerized client devices to remove the impression data from storage associated therewith.

20. The computer readable apparatus of claim 13, wherein the plurality of instructions are further configured to, when executed on the processing apparatus, cause the computerized network apparatus to:
transmit data representative of one or more segmentation profiles to the one or more computerized client devices, the data representative of the one or more segmentation profiles configured to enable the one or more computerized client devices to correlate available secondary content with at least one of a particular receiver device or household.

* * * * *